(12) United States Patent
Harumoto et al.

(10) Patent No.: US 7,016,970 B2
(45) Date of Patent: Mar. 21, 2006

(54) SYSTEM FOR TRANSMITTING STREAM DATA FROM SERVER TO CLIENT BASED ON BUFFER AND TRANSMISSION CAPACITIES AND DELAY TIME OF THE CLIENT

(75) Inventors: Hideaki Harumoto, Moriguchi (JP); Masaki Horiuchi, Katano (JP); Takahisa Fujita, Ikeda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 917 days.

(21) Appl. No.: 09/898,004

(22) Filed: Jul. 5, 2001

(65) Prior Publication Data

US 2002/0004840 A1    Jan. 10, 2002

(30) Foreign Application Priority Data

Jul. 6, 2000    (JP) .............................. 2000-204632

(51) Int. Cl.
G06F 15/16    (2006.01)
(52) U.S. Cl. ..................... 709/233; 709/231; 709/219; 709/237
(58) Field of Classification Search ................ 709/231, 709/203, 206, 233, 219, 237
See application file for complete search history.

(56) References Cited

U.S. PATENT DOCUMENTS 5,565,924 A * 10/1996 Haskell et al. ........... 348/423.1
5,568,165 A * 10/1996 Kimura ....................... 345/547
5,675,379 A * 10/1997 Kato et al. .................... 348/97
5,719,853 A    2/1998 Ikeda
5,903,261 A * 5/1999 Walsh et al. ............. 715/500.1
5,914,751 A    6/1999 Korth
5,918,020 A * 6/1999 Blackard et al. ............ 709/228
5,956,321 A * 9/1999 Yao et al. ..................... 370/230
6,002,802 A * 12/1999 Chujoh et al. .............. 382/236
6,292,834 B1 * 9/2001 Ravi et al. ................... 709/233
6,480,902 B1 * 11/2002 Yuang et al. ................ 709/248

FOREIGN PATENT DOCUMENTS

EP    0 713 341    5/1996
JP    2000-134371    5/2000

* cited by examiner

Primary Examiner—Le Hien Luu
(74) Attorney, Agent, or Firm—Wenderoth, Lind & Ponack, L.L.P.

(57) ABSTRACT

A terminal determines a target value of stream data to be stored in its buffer in relation to its buffer capacity and the transmission capacity of the network. Also, the terminal arbitrarily determines a delay time from when the terminal writes a head data of the stream data to the buffer to when the terminal reads the data to start playback in a range not exceeding a value obtained by dividing the buffer capacity by the transmission capacity. The target value and the delay time are then both notified to a server. Based on those notified values, the server controls the transmission speed so that the buffer occupancy of the terminal changes in the vicinity of the target value without exceeding the target value.

15 Claims, 20 Drawing Sheets

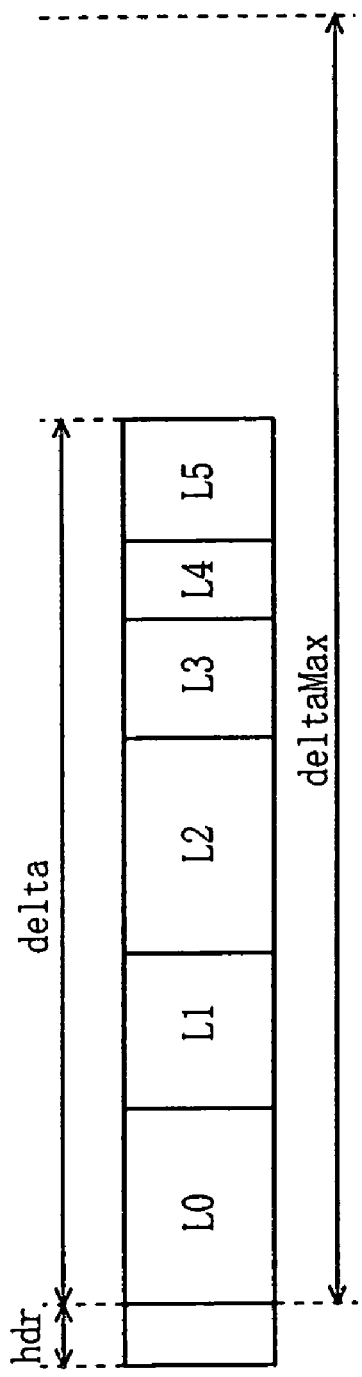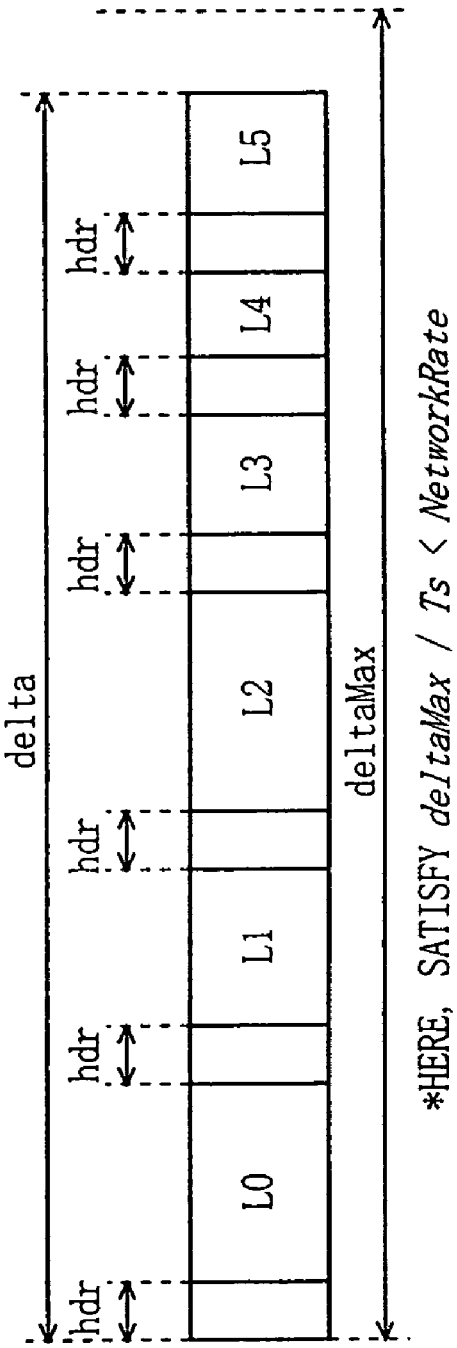

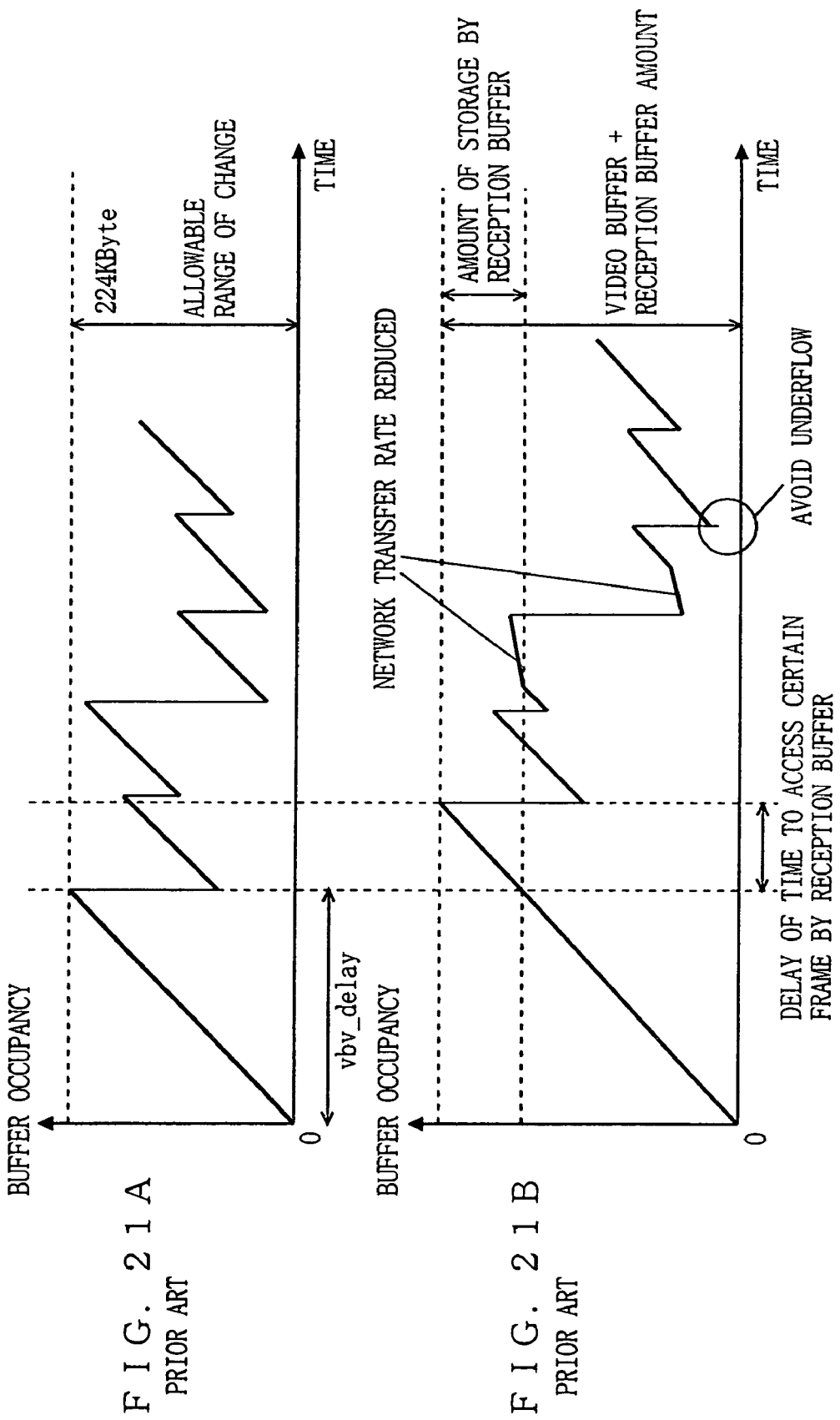

SYSTEM FOR TRANSMITTING STREAM DATA FROM SERVER TO CLIENT BASED ON BUFFER AND TRANSMISSION CAPACITIES AND DELAY TIME OF THE CLIENT

BACKGROUND OF THE INVENTION

1. Field of the Invention

The present invention relates to streaming methods and, more specifically, to a streaming method wherein a server transmits multimedia data over the Internet to a terminal, and the terminal plays back the multimedia data while receiving the multimedia data from the server.

2. Description of the Background Art

Description of Encoding and Compressing Scheme for Multimedia Data, and Buffer Model Multimedia data that is transmitted over the Internet varies in type such as moving pictures, still pictures, audio, text, and data having these types of data multiplexed thereon. To encode and compress the moving pictures, H. 263, MPEG-1, MPEG-2, and MPEG-4 are well known. For the still pictures, JPEG is well known, and for the audio, MPEG audio, G. 729, etc. are well known; the list is thus endless.

In the present invention, the main concern is streaming playback. Thus, moving pictures and audio are mainly transmitted. Described herein are an MPEG video which is popularly applied to compress the moving pictures, especially an MPEG-1(ISO/IEC 11172) video, and an MPEG-2 (ISO/IEC 13818) video which is relatively simple in process.

The MPEG video has the following two main characteristics to realize data compression with high efficiency. The first characteristic is a compression scheme utilizing intra-frame temporal correlation which is applied together with a conventional compression scheme utilizing spatial frequency to compress the moving picture data. In data compression by MPEG, frames (pictures) structuring one stream are classified into three types of frames called I, P, and B frames. In more detail, the I frame is an Intra-Picture, the P frame is a Predictive-Picture which is predicted from information presented in the nearest preceding I or P frame, and the B frame is a Bidirectionally predictive-picture which is predicted from information presented in both the nearest preceding I or P frame and the nearest following I or P frame. Among those three type of frames, the I frame is the largest, that is, information carried thereby is the largest among all, the P frame is the second-largest, and the B frame is the smallest. Here, although the frames are rather compression algorithm dependent, an information ratio among those frames is about I:P:B=4:2:1. Generally in the MPEG video stream, out of every GOP (group of pictures) of 15 frames, the I frame occurs once, the P frame occurs four times, and the B frame occurs ten times.

The second characteristic of the MPEG video is to dynamically allocate information on a picture basis according to the complexity of a target image. An MPEG decoder is provided with a decoder buffer, and data is once stored therein before decoding. In this manner, any complex image which is difficult to compress can be allocated with a large amount of information. Not restricting only to MPEG, in any other compression scheme for the moving pictures, the capacity of the general-type decoder buffer is often defined by standards. In MPEG-1 and MPEG-2, the capacity of the standardized-type decoder buffer is 224 KByte. An MPEG encoder thus needs to generate picture data so that the occupancy of the decoder buffer remains within the capacity.

FIGS. 19A to 19C are diagrams for illustrating a conventional streaming method. Specifically, FIG. 19A shows video frames, FIG. 19B is a diagram schematically showing the change of buffer occupancy, and FIG. 19C is a diagram exemplarily showing the structure of a conventional terminal. In FIG. 19C, the terminal includes a video buffer, a video decoder, an I/P re-order buffer, and a switch. Herein, the video buffer corresponds to the above-described decoder buffer. Any incoming data is once stored in the video buffer, and is then decoded by the video decoder. The decoded data then goes through the I/P re-order buffer and the switch, and is arranged in a temporal order of playback.

In FIG. 19B, the longitudinal axis denotes the buffer occupancy, that is, the amount of data that is stored in the video buffer, and the lateral axis denotes the time. In FIG. 19B, the thick line denotes the temporal change of the buffer occupancy. Further, the slope of the thick line corresponds to the bit rate of the video, and indicates that the data is inputted to the buffer at a constant rate. FIG. 19B also shows that the buffer occupancy is decreased at constant intervals (e.g., 33.3667 msec). This is because the data in each video frame is continuously decoded in a constant cycle. Also, in FIG. 19B, every intersection point of the diagonal dotted line and the time axis denotes a time when the data in each video frame starts heading for the video buffer. Accordingly, it is known that a frame X in FIG. 19A starts heading for the video buffer at t1, and a frame Y starts heading for the video buffer at t2.

In FIGS. 19A and 19B, the length of time from t1 to a time when decoding is first performed (in FIG. 19B, a point at which the thick line first drops) is generally referred to as a time vbv_delay. Decoding is performed immediately after the video buffer is filled. Therefore, the time vbv_delay usually denotes a length of time for the video buffer of 224 KByte to be full from video being input thereto. That is, denoted thereby is an initial delay time (latency time to access a specific frame) from when video is input to when video is played back by the decoder.

In the case that the frame Y in FIG. 19A is a complex image, the frame Y includes a large amount of information. Thus, as shown in FIG. 19B, data transfer to the video buffer needs to be started earlier (t2 in the drawing) than the decoding time for the frame Y (t3). Note that, no matter how complex the image of the frame Y is, the available buffer occupancy remains within 224 KByte.

If data transfer to the video buffer is performed so as to maintain such a change of buffer occupancy as shown in FIG. 19B, the MPEG standard assures that streaming is not disturbed due to underflow and overflow of the video buffer.

Description of Reception Buffer for Transfer Jitter Absorption on a Network

As shown in FIG. 20, in a system where a server 201 and a terminal 202 are connected to each other through a network 203, a transfer rate fluctuates when MPEG data in a storage 210 is distributed. This fluctuation is due to a time for packet assembly in a generation module 211, a time for a transfer procedure in network devices 204 and 205, and a transfer delay time due to congestion on the network 203, for example. Thus, the change of buffer occupancy shown in FIG. 19B actually cannot be maintained. As a method for reducing and absorbing such fluctuation of the transfer rate (transfer jitter), a content of the encoding rate which is sufficiently smaller than that of the bandwidth of the network is to be transferred. However, from a view point of efficiently utilizing the network resource to provide high-quality video and audio, this method is not considered appropriate. Therefore, a method is generally applied for always transferring data a little ahead of time, and if data transfer is delayed, data shortage is compensated. In this case, the network devices 204 and 205 are provided with transmission and reception buffers 206 and 207, respectively.

Here, providing the reception buffer 207 on the terminal 202 side means approximately the same as increasing the capacity of a decoder buffer 208 from the standardized 224 KByte by the capacity of the reception buffer 207. For comparison, FIGS. 21A and 21B show the change of buffer occupancy before and after the reception buffer 207 is included. Here, FIG. 21A is the same as FIG. 19B.

By adding the reception buffer 207, the buffer capacity is increased, and the change of buffer occupancy looks as shown in FIG. 21B. Accordingly, even if the transfer rate of the network is decreased, the buffer will not underflow. On the other hand, the time vbv_delay is lengthened by a time corresponding to the capacity of the reception buffer 207. As a result, the starting time for decoding in a decoder 209 and the starting time for playback in a playback device 212 are both delayed. That is, the time to access a specific frame is increased by the time that is taken for data storage in the reception buffer 207.

As is known from the above, in a network environment such as small-scale LAN where credibility and transmission speed are assured, when the multimedia data such as MPEG data is subjected to streaming playback, streaming playback may not be distributed due to underflow and overflow of the decoder buffer. This is basically true as long as the system is designed so as to keep the initial delay time (vbv_delay) at playback specified by codec specifications and the change of decoder buffer occupancy.

However, in the wide area network such as the Internet, the transfer jitter resulting from fluctuation of transmission characteristics of the transmission path is too large to ignore. Therefore, together with the decoder buffer (vbv buffer) within the codec specifications, the conventional terminal 202 often includes another buffer as the reception buffer 207 of FIG. 20 for transfer jitter absorption. If this is the case, however, another problem arises.

The capacity of such buffer included in the terminal for jitter absorption generally varies depending on the device type. Therefore, even if data is distributed under the same condition, the device with a large buffer capacity can perform streaming playback with no problem, but the device with a small buffer capacity cannot absorb the jitter enough and thus fails in streaming playback.

To solve this problem, for example, the buffer capacity for jitter absorption may be sufficiently increased by increasing the amount of memory in the terminal. However, the memory is the one mainly determining the price of the terminal, and as to the price, the cheaper is desirably the better. Also, if the buffer capacity for jitter absorption is too large, a time to access a specific frame resultantly takes longer, which inevitably will irritate the user.

SUMMARY OF THE INVENTION

Therefore, an object of the present invention is to provide a streaming method for preventing streaming playback from being disturbed due to underflow and overflow of a buffer even if the buffer capacity in the terminal varies depending on device type, and even if the transmission capacity of the network fluctuates. Further, while preventing streaming playback from being disturbed, the streaming method can also reduce the amount of time that is taken to access a specific frame.

The present invention has the following features to attain the object described above.

A first aspect of the present invention is directed to a streaming method in which a server transmits stream data to a terminal over a network, and the terminal plays back the stream data while receiving the stream data. The method of the first aspect comprises:

a target value determination step of determining, in the terminal, a target value of the stream data to be stored in a buffer of the terminal in relation to a buffer capacity and a transmission capacity of the network, a delay time determination step of arbitrarily determining, in the terminal, a delay time from when the terminal writes head data of the stream data to the buffer to when the terminal reads the data to start playback, in a range not exceeding a value which is obtained by dividing the buffer capacity by the transmission capacity;

a step of the terminal notifying the determined target value and the delay time to the server; and a control step of controlling, in the server, a transmission speed based on the notified target value and the delay time when the server transmits the stream data to the terminal over the network.

As described above, in the first aspect, the terminal itself determines a target value in relation to its own buffer capacity and the transmission capacity of the network. The terminal also determines a delay time within a value range not exceeding a value which is obtained by dividing the buffer capacity by the transmission capacity. Based on the target value and the delay time thus determined by the terminal, the server accordingly controls the transmission speed. Therefore, even if the buffer capacity varies due to the device type, and even if the transmission capacity of the network fluctuates, the transmission speed can be appropriately controlled according to the buffer capacity and the transmission capacity. As a result, streaming playback due to underflow and overflow of the buffer is successfully undisturbed. What is better, the delay time is determined separately from the target value, and therefore, the streaming playback can be avoided, and at the same time, the waiting time to access a specific frame is reduced.

Here, the reason why the delay time is limited to a value which is equal to or smaller than the value that is obtained by dividing the buffer capacity by the transmission capacity is that streaming playback is likely to be disturbed if the delay time exceeds the value. If the delay time not exceed the value, the delay time may take any value. Note here that, to determine the value, there needs to be a consideration of a balance between the resistance to the fluctuation of the transmission capacity and a waiting time to access any specific frame.

According to a second aspect of the present invention, in accordance with the first aspect, in the control step, the server controls the transmission speed so that an amount of the stream data that is stored in the buffer of the terminal changes in the vicinity of the target value without exceeding the target value.

As described above, in the second aspect, the storage changes in the vicinity of the target value without exceeding the target value. Therefore, the buffer hardly underflows and overflows.

According to a third aspect of the present invention, in accordance with the second aspect, in the control step, the server estimates and calculates the amount of the stream data stored in the buffer of the terminal based on the transmission speed, the delay time, and a speed of the terminal decoding the stream data.

As described above, in the third aspect, the server estimates and calculates the storage, and based thereon, the transmission speed is controlled. Therefore, the storage can be changed in the vicinity of the target value without exceeding the target value.

Here, the terminal may notify the current storage to the server, and based on this information, the server may control the transmission speed. If this is the case, however, it takes time to transmit the information from the terminal to the server, and thus the server controls the transmission speed based on the previous storage. Therefore, the storage is not always able to be changed in the vicinity of the target value without exceeding the target value.

According to a fourth aspect of the present invention, in accordance with the first aspect, the streaming method further comprises:
  a detection step of detecting, in the terminal, that the transmission capacity of the network exceeds a predetermined threshold value;
  a target value change step of changing, in the terminal, the target value based on a result detected by the terminal in the detection step; and
  a step of notifying, in the terminal, a new target value after the change to the server.

Further, according to the forth aspect, in the control step, when receiving the new target value after the change, the server controls the transmission speed so that the amount of the stream data that is stored in the buffer of the terminal changes in the vicinity of the new target value after the change without exceeding the new target value after the change.

As described above, in the fourth aspect, when the transmission capacity exceeds the threshold value, the target value is changed by the terminal. The server follows the change of the target value by controlling the transmission speed to be changed in the vicinity of the changed target value without exceeding the target value.

According to a fifth aspect of the present invention, in accordance with the fourth aspect, in the detection step, when detecting the transmission capacity of the network as falling short of a first threshold value, the terminal controls the target value to be increased in the target value change step, and, in the control step, responding to the target value as being increased, the server controls the transmission speed to be increased.

As described above, in the fifth aspect, when the transmission capacity exceeds the first threshold value, the target value is increased by the terminal. The server then follows the increase of the target value by increasing the transmission speed.

According to a sixth aspect of the present invention, in accordance with the fifth aspect, the first threshold value is approximately a median value of an achievable maximum transmission capacity and a transmission capacity with which a stream data transfer loss starts occurring.

As described above, in the sixth aspect, when the transmission capacity starts decreasing, before any stream transfer loss starts occurring, the transmission speed is increased to thereby increase the storage. In this manner, even if the transmission capacity is further decreased, streaming playback is successfully avoided.

According to a seventh aspect of the present invention, in accordance with the fourth aspect, in the detection step, when detecting that the transmission capacity of the network falls short of a second threshold value which is smaller than the first threshold value, the terminal controls the target value to be decreased in the target value change step, and, in the control step, responding to the target value as being decreased, the server controls the transmission speed to be decreased.

As described above, in the seventh aspect, when the transmission capacity falls short of the second threshold value, the target value is decreased by the terminal. The server then follows the decrease of the target value by decreasing the transmission speed.

According to an eighth aspect of the present invention, in accordance with the seventh aspect, the second threshold value is a value corresponding to the transmission capacity with which the stream data transfer loss starts occurring.

As described above, in the eighth aspect, when the transmission capacity starts decreasing to a greater degree, and when the stream transfer loss starts occurring, the transmission speed is then decreased. This is done not to disturb the processing of retransmitting the lost data.

Here, to decrease the transmission speed, the server needs to skip transmitting the frames with a frequency according to the decrease. With the frame skip, the quality of the image and audio to be played back by the terminal resultingly deteriorates. To suppress this quality deterioration, in the following ninth aspect, the frame to be skipped is selected from among any frame which cannot be in time for its presentation time. In a tenth aspect below, the frame to be skipped is selected from among any frame with lower priority, and any frame which cannot be in time for its presentation time although its priority is high.

According to a ninth aspect of the present invention, in accordance with the eighth aspect, when the terminal controls the target value to be decreased in the target value change step, in the control step, the server controls the transmission speed to be decreased by comparing a presentation time of each frame structuring the stream data to be transmitted with a current time, and skipping transmitting any frame whose presentation time is older than the current time.

As described above, in the ninth aspect, any frame which cannot be in time for its presentation time is selectively skipped. In this manner, as compared with a case where a frame skip is performed at random, the quality deterioration due to the decrease of the transmission speed can successfully suppressed.

According to a tenth aspect of the present invention, in accordance with the eighth aspect, when the terminal controls the target value to be decreased in the target value change step, in the control step, the server:
  compares a priority level of each frame structuring the stream data to be transmitted with a reference value;
  skips transmitting each frame whose priority level is lower than the reference value; and
  for any frame whose priority level is higher than the reference value, compares each presentation time with the current time, and skips transmitting any frame whose presentation time is older than the current time.

As described above, in the tenth aspect, any frame with a lower priority and any frame which cannot be in time for its presentation time although its priority is high is selectively skipped. In this manner, as compared with a case where a frame skip is performed at random, the quality deterioration due to the decrease of the transmission speed can successfully suppressed.

Here, such method in the tenth aspect of considering the priority level together with the presentation time at the time of frame selection is typically applied to video frames by MPEG. In this case, when the transmission speed is decreased, the frames of P and B are skipped as being considered low in priority level. However, the frames of I are considered high in priority level and are not skipped except for a case where those frames of I cannot be in time for their presentation time. Therefore, the quality deterioration due to the decrease of the transmission speed is minimized in any played back image. Here, if this method is applied to audio frames by MPEG, such frames are similar in priority level, and thus only the presentation time thereof is considered.

An eleventh aspect is directed to a system including a server for transmitting stream data over a network, and a terminal for playing back the stream data while receiving the stream data. The terminal comprises:

target value determination means for determining a target value of stream data to be stored in a buffer of the terminal in relation to a buffer capacity and a transmission capacity of the network;

delay time determination means for arbitrarily determining, in a range not exceeding a value obtained by dividing the buffer capacity by the transmission capacity, a delay time from when the terminal writes head data of the stream data to the buffer to when the terminal reads the data to start playback; and means for notifying the determined target value and the delay time to the server.

The server comprises control means for controlling a transmission speed based on the notified target value and the delay time when transmitting the stream data to the terminal over the network.

A twelfth aspect of the present invention is directed to a terminal working with a server for transmitting stream data over a network, and playing back the stream data while receiving the stream data. The server in the twelfth aspect comprises control means for controlling a transmission speed based on a target value and a delay time when transmitting the stream data to the terminal over the network.

The terminal in the twelfth aspect comprises:

target value determination means for determining the target value of the stream data to be stored in a buffer in relation to a buffer capacity of the terminal and a transmission capacity of the network;

delay time determination means for arbitrarily determining, in a range not exceeding a value obtained by dividing the buffer capacity by the transmission capacity, the delay time from when the terminal writes head data of the stream data to the buffer to when the terminal reads the data to start playback; and means for notifying the determined target value and the delay time to the server.

A thirteenth aspect of the present invention is directed to a server for transmitting stream data over a network, and working together with a terminal for playing back the stream data while receiving the stream data.

The terminal in the thirteenth aspect comprises:

target value determination means for determining a target value of the stream data to be stored in a buffer of the terminal in relation to a buffer capacity and a transmission capacity of the network;

delay time determination means for arbitrarily determining, in a range not exceeding a value obtained by dividing the buffer capacity by the transmission capacity, a delay time from when the terminal writes head data of the stream data to the buffer to when the terminal reads the data to start playback; and means for notifying the determined target value and the delay time to the server.

The server comprises control means for controlling a transmission speed based on the notified target value and the delay time when the server transmits the stream data to the terminal over the network. The control means controls the transmission speed so that the amount of the stream data stored in the buffer of the terminal changes in the vicinity of the target value without exceeding the target value.

A fourteenth aspect of the present invention is directed to a program describing the streaming method of the first aspect described above.

A fifteenth aspect of the present invention is directed to a recording medium on which the program of the fourteenth aspect described above is recorded.

These and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a diagram exemplarily showing the structure of a packet generated by the server 101 of FIG. 1, where (A) of FIG. 15 shows a case where a plurality of frames are inserted into one packet, and (B) of FIG. 15 shows a case where one frame is inserted into one packet;

FIG. 21A is a diagram for illustrating the change of the buffer occupancy before an additional reception buffer is added; and FIG. 21B is a diagram for illustrating the change in the buffer occupancy after the additional reception buffer is added.

DETAILED DESCRIPTION OF THE PREFERRED EMBODIMENT

Figure 1:
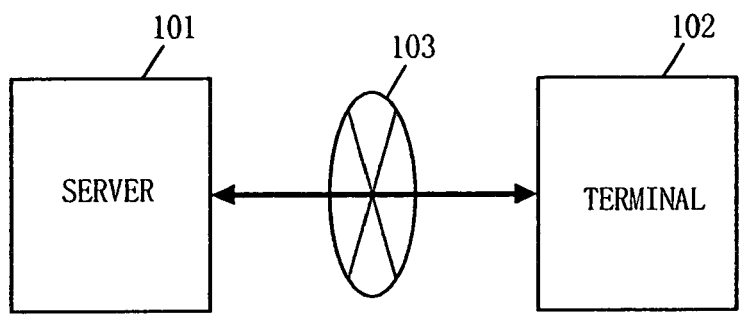
FIG. 1 is a block diagram exemplarily showing the structure of a server-client system wherein a streaming method according to one embodiment of the present invention is carried out.

With reference to the accompanying drawings, an embodiment of the present invention is described. FIG. 1 is a block diagram showing an example of the structure of a server-client system wherein a streaming method according to the present embodiment is carried out. In FIG. 1, the present system includes a server 101, and a terminal 102 operating as a client for the server 101. Data such as video and audio is stored on the server side 101. This data has been encoded and compressed by MPEG. The server 101 responds to a request from the terminal 102, and generates a stream by assembling the stored data into packets. Then, the server 101 transmits the generated stream to the terminal 102 over a network 103. The terminal 102 receives and decodes the stream, and outputs resulting video and audio for display.

Figure 2:
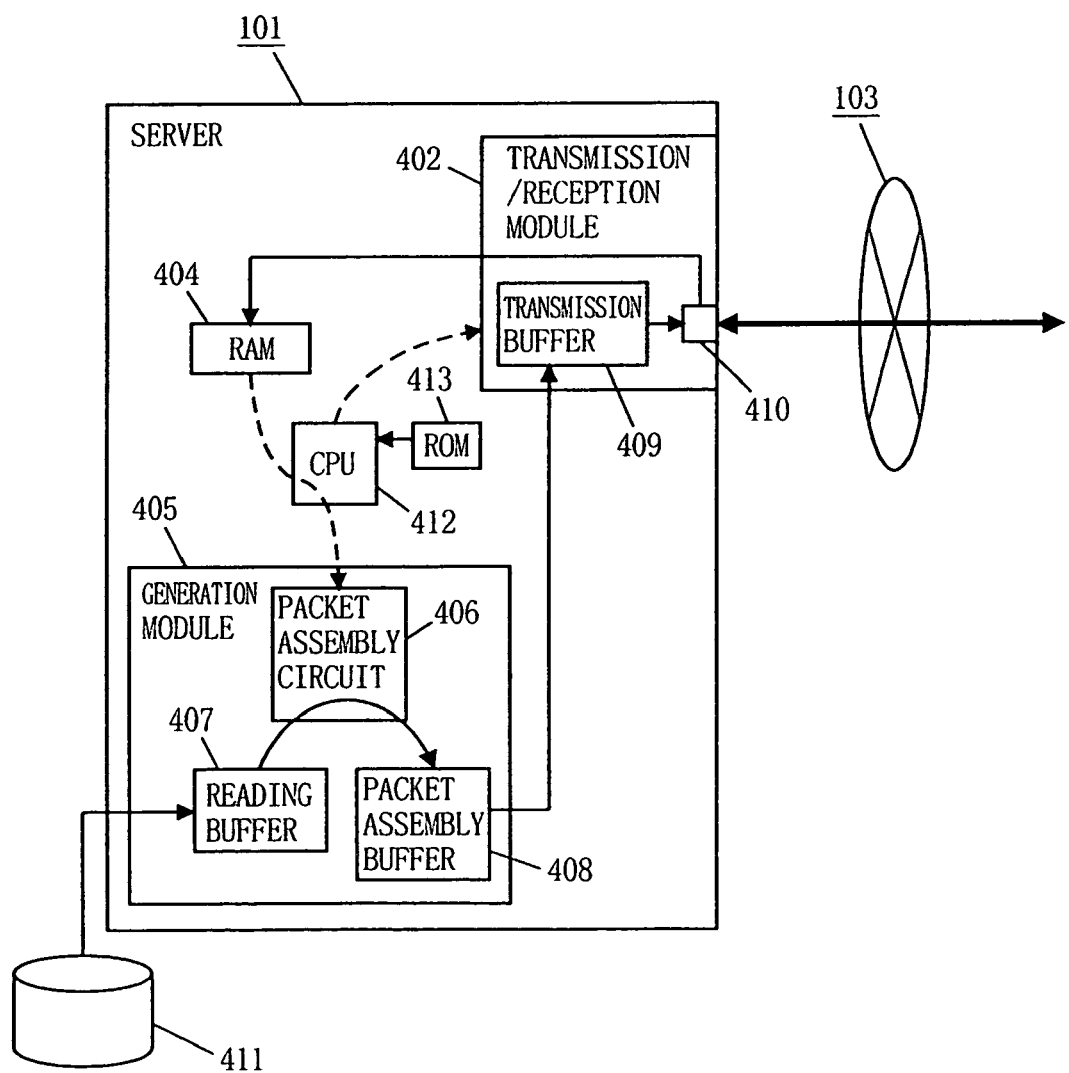
FIG. 2 is a block diagram showing the structure of a server 101 of FIG. 1.

FIG. 2 is a block diagram showing the structure of the server 101 of FIG. 1. In FIG. 2, the server 101 includes a storage device 411, a transmission/reception module 402, a generation module 405, a RAM 404, a CPU 412, and a ROM 413. The storage device 411 stores data such as video and audio. The data stored in the storage device 411 is provided to the generation module 405. The generation module 405 includes a reading buffer 407, a packet assembling circuit 406, and a packet assembling buffer 408. The generation module 405 generates a stream by assembling any received data into packets.

The transmission/reception module 402 includes a network controller 410, and a transmission buffer 409. The transmission/reception module 402 transmits the stream which is generated by the generation module 405 to the terminal 102 over the network 103, and also receives any information coming from the terminal 102 over the network 103.

The information from the terminal 102 that is received by the transmission/reception module 402 is written into the RAM 404. The ROM 413 stores a server control program, and the CPU 412 executes the server control program while referring to the information that is stored in the RAM 404. Thereby, the CPU 412 controls the transmission/reception module 402 and the generation module 405. Here, the server control program is not necessarily stored in the ROM 413 but may be stored in a recording medium excluding the ROM, for example, in a hard disk and/or a CD-ROM.

Figure 3:
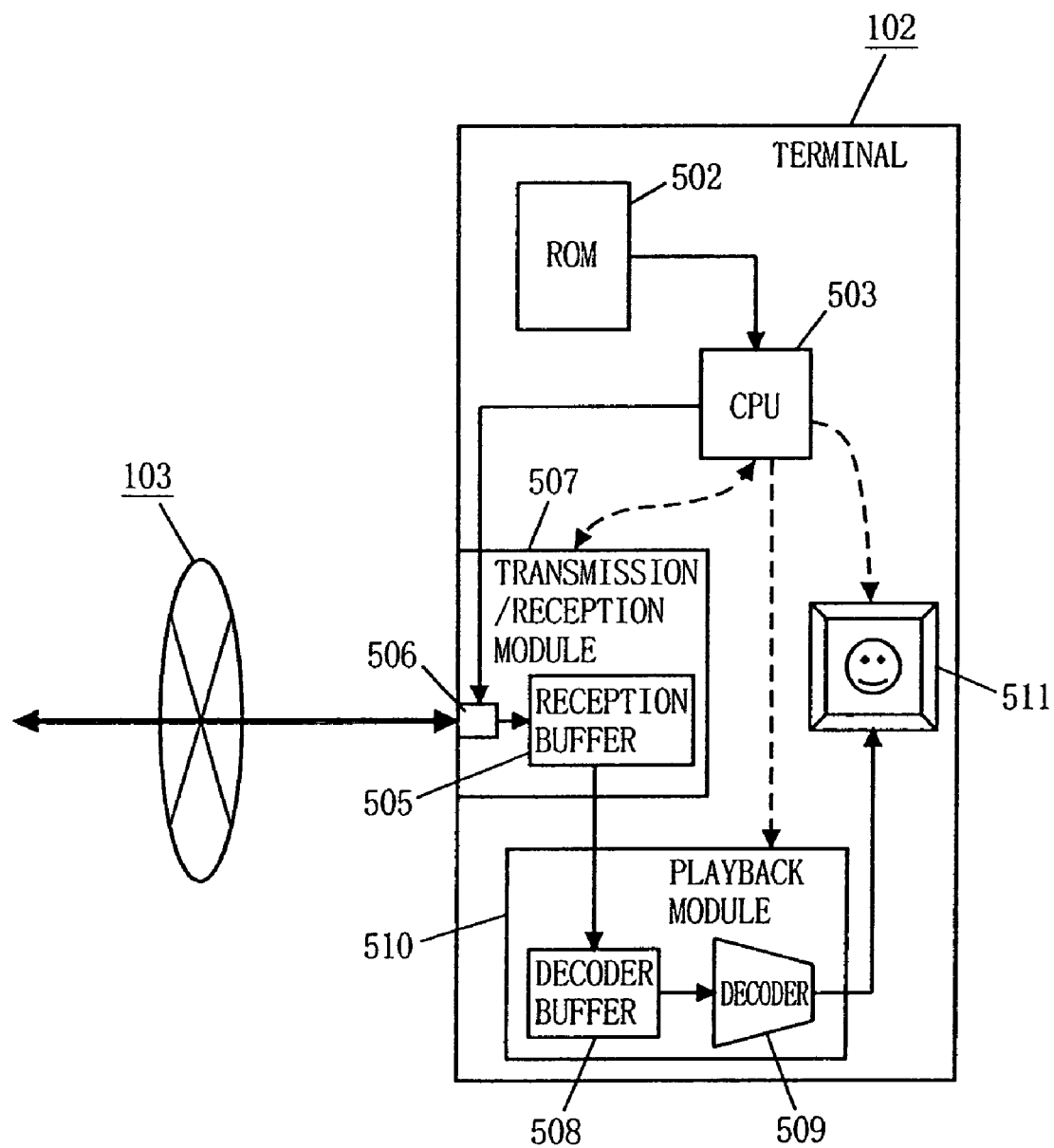
FIG. 3 is a block diagram showing the structure of a terminal 102 of FIG. 1.

FIG. 3 is a block diagram showing the structure of the terminal 102 of FIG. 1. In FIG. 3, the terminal 102 includes a transmission/reception module 507, a playback module 510, a display device 511, a ROM 502, and a CPU 503. The transmission/reception module 507 includes a network controller 506, and a reception buffer 505, and the transmission/reception module 507 receives any stream coming from the server 101 over the network 103. Also, the transmission/reception module 507 transmits any information from the CPU 503 to the server 101 over the network 103.

The stream that is received by the transmission/reception module 507 is inputted to the playback module 510. The playback module 510 includes a decoder buffer 508, and a decoder 509, and the playback module 510 decodes and plays back the stream inputted thereto. The data which is played back by the playback module 510 is then provided to a display device 511. The display device 511 then converts the data into a video for display.

The ROM 502 stores a terminal control program, and the CPU 503 executes the terminal control program to control the transmission/reception module 507, the playback module 510, and the display device 511.

Figure 4:
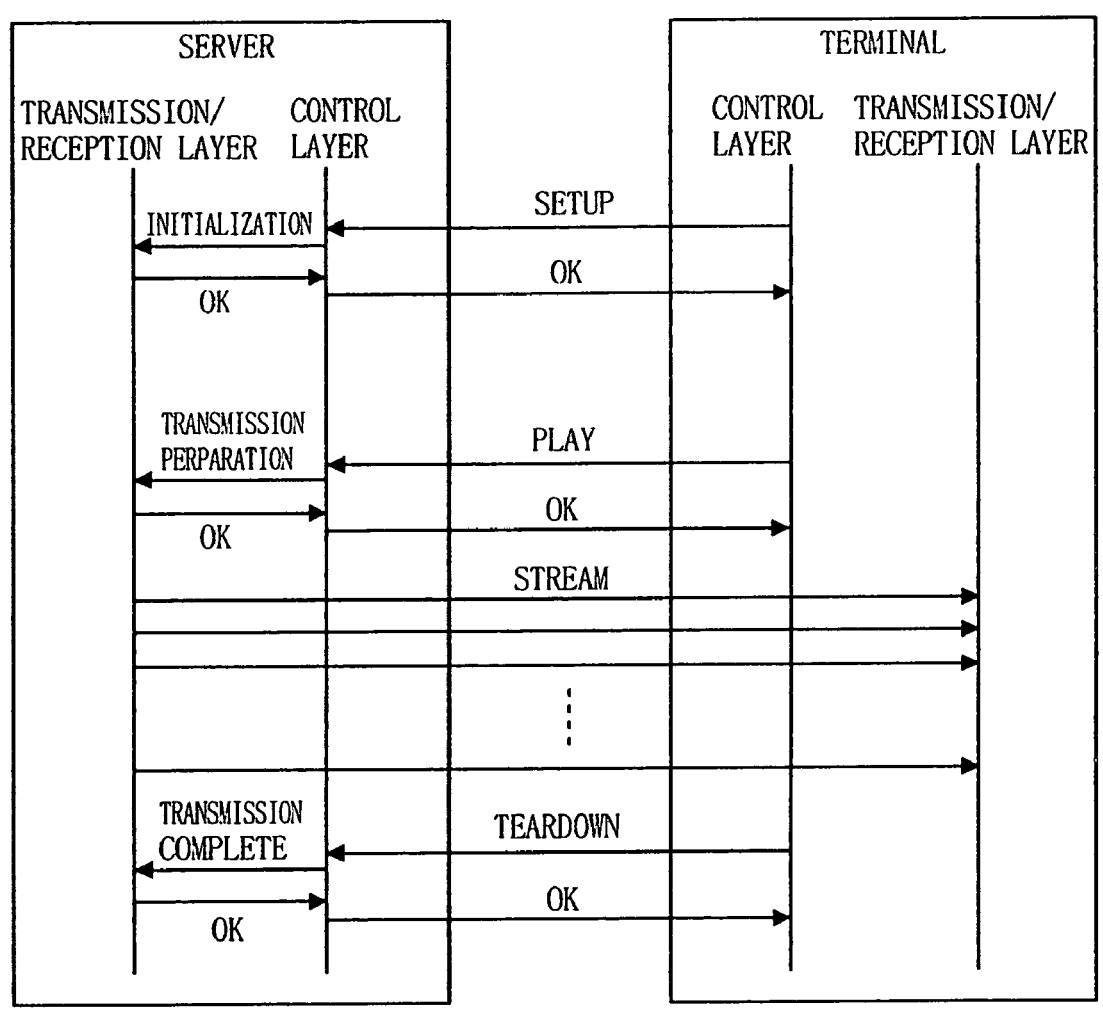
FIG. 4 is a sequence diagram for illustrating the comprehensive operation of the system of FIG. 1.

The operation of the system in such a structure will now be described. FIG. 4 is a sequence diagram for illustrating the comprehensive operation of the system of FIG. 1. FIG. 4 shows a transmission/reception layer and a control layer on the server 101 side, another transmission/reception layer and control layer on the terminal 102 side, and commands and streams which are exchanged between these layers arranged in a time sequence.

The comprehensive operation of the present system will be described first with reference to FIG. 4. In FIG. 4, a command "SETUP" is transmitted from the terminal 102 to the server 101. In response to the command "SETUP", the server 101 performs initialization, and once completed, transmits an "OK" to the terminal 102.

In response to the "OK" from the server 101, the terminal 102 then transmits a command "PLAY" to the server 101. In response to the command "PLAY", the server starts making preparation for transmission, and once completed, transmits an "OK" to the terminal 102.

In response to the "OK" from the server 101, the terminal 102 transits to be in a state waiting for data streams. Then, the server 101 first transmits the "OK", and then starts transmitting the data streams.

Thereafter, the terminal 102 transmits a command "TEARDOWN" to the server 101, and the server 101 responsively terminates transmitting the data streams. Once transmission is terminated, the server 101 transmits an "OK" to the terminal 102.

In response to the "OK" from the server 101, the terminal 102 exits from the waiting state for the data streams.

This is the brief description of the comprehensive operation of the present system. As far as the description above is concerned, the present system operates the same as the conventional system. However, the differences between the present system and the conventional system are the following two respects (1) and (2).

(1) The command "SETUP" that is transmitted from the terminal 102 to the server 101 is attached with parameters "S_target" and "T_delay". When transmitting the data streams, the server 101 controls the transmission speed based on these parameters.

In the above (1), the parameter "S_target" is a target value for the amount of data which is to be stored in the buffer by the terminal 102, and is determined based on the entire capacity ("S_max") of the buffer which is included in the terminal 102 (in the example of FIG. 3, the reception buffer 505 and the decoder buffer 508) and the transmission capacity of the network 103. Therefore, the parameter "S_target" generally varies in value depending on the type of the terminal 102.

The parameter "T_delay" is a time which is taken for the terminal 102 to write the head data to the buffer, read the data, and start decoding the data (that is, a delay time to access a specific frame), and is arbitrarily determined within a value range not exceeding the value which is obtained by dividing the parameter "S_target" by the transmission speed (will be described later). Here, although such condition is composed as "not exceeding the value which is obtained by dividing the parameter 'S_target' by the transmission speed", the terminal 102 can determine the parameter "T_delay" separately from the parameter "S_target".

Here, the "transmission speed" indicates the amount of information to be transmitted within a unit time. For example, in the case where the number of packets to be transmitted in the unit time is determined in advance, the amount of data to be provided to one packet can be increased/decreased to control the transmission speed. If the amount of data in one packet is determined in advance, the temporal interval between any two packets may be shortened/lengthened to control the transmission speed. Alternatively, both of those may be simultaneously carried out to control the transmission speed, that is, the amount of data provided to one packet is increased/decreased, and the temporal interval between any two packets is shortened/lengthened. In the present embodiment, the amount of data in one packet is increased/decreased to control the transmission speed.

(2) The terminal 102 can change the parameter "S_target" as required during when the data streams are being distributed. If this is the case, the parameter "S_target" after the change is transmitted from the terminal 102 to the server 101, and the server 101 accordingly controls the transmission speed based on the newly received parameter "S_target".

In the above (2), the parameter "S_target" is changed according to the fluctuation of the transmission capacity of the network 103. To be specific, assuming that the terminal 102 is a mobile phone, the field intensity (e.g., four intensity levels of "high, medium, low, out of area") can be detected. Thus, any change which is observed in the field intensity is regarded as "the change of transmission capacity of the network 103", and the parameter "S_target" is accordingly changed. For example, if the field intensity is changed from "high" to "medium", the terminal 102 changes the parameter "S_target" to a larger value, and if the field intensity is changed from "medium" to "low", the parameter "S_target" is changed to a smaller value.

These are the main two points which are considered to be the operational differences between the present and conventional systems.

A specific example of the comprehensive operation of the present system will now be described in detail. In FIG. 4, prior to starting streaming playback on the terminal 102 side, the CPU 503 extracts from the ROM 502 a group of parameters which are unique to the terminal by following the terminal control program. In the group of parameters, the parameter S_max indicating the total capacity of the reception buffer 505 and the decoder buffer 508 (i.e., the maximum amount of data that can actually be stored by the terminal 102). Here, presumably, the CPU 503 has been informed in advance of an encoding and compressing rate Vr of any data stream and a frame occurrence cycle Tfrm of video and audio through the procedure for previously obtaining streaming playback auxiliary data, and the like. Also, presumably, the CPU 503 has detected the transmission capacity of the network 103 via the network interface, including the intensity of radio waves received by the mobile phone, and a communication speed (as for a PHS, information telling which of 64 Kbps connection and 32 Kbps connection), for example.

Based on the parameter S_max, rate Vr, cycle Tfrm, and the transmission capacity of the network 103 (e.g., effective transfer rate=networkRate), the CPU 503 then determines the parameters S_target, which is a target value for the amount of data to be stored in the buffer by the terminal 102, and a prebuffering time T_delay (i.e., delay time to access any specific frame) indicating the time that will be taken to start streaming playback.

Here, the parameter S_target (target value) is, in the essential sense, a reference value for streaming playback to be started. With the parameter S_target, streaming playback can be continuously and normally performed under the condition that the buffer occupancy of the terminal changes in the vicinity of the parameter S_target. As described above, if the value of the parameter T_delay is large, the time to access any specific frame takes longer. On the other hand, the resistance to the transfer jitter is improved. The issue here is, if the delay time takes too long, it is considered inappropriate as service specifications. Accordingly, to determine the parameter T_delay, the resistance to the transfer jitter and the waiting time to access any specific frame need to be well balanced.

Here, instead of the parameter T_delay, or together therewith, another parameter S_delay may be determined. Here, the parameter S_delay indicates the amount of data (Byte), and once the buffer in the terminal 102 reaches the amount, decoding is preformed. In the case where the terminal 102 determines only the parameter S_delay and notifies it to the server 101, the parameter S_delay can be converted into the parameter T_delay on the server 101 side by applying such equation as T_delay=S_delay/networkRate. Here, the value of the parameter S_delay may indicate a filling rate rS(%) with respect to the total buffer occupancy S_max. If this is the case, the equation for conversion is S_delay=S_max*rS/100.

When those parameters S_target and T_delay (and/or S_delay) are ready, as shown in FIG. 4, the terminal 102 issues a SETUP command prompting the server 101 to prepare for data stream distribution. The SETUP command includes, as arguments, the parameters S_target and T_delay (and/or S_delay). Once the server 101 receives the SETUP command, the server 101 stores those arguments in the RAM 404, and proceeds with initialization for data stream distribution. Specifically, the CPU 412 of the server 101 first extracts those arguments from the RAM 404. Then, for example, a source file of the data stream is read from the storage device 411 and written to the buffer 407, and a parameter for the packet assembling circuit 406, in which the read data is assembled into packets, is set. Herein, the packet assembling circuit 406 is not necessarily dedicated hardware, and may be a program (software algorithm) for causing the CPU 412 in the server 101 (for example, realized by a workstation) to execute the packet assembly processing in a similar manner.

Two values of the above-described parameters S_target and T_delay (and/or S_delay) are provided to the packet assembling circuit 406. In the packet assembling circuit 406, an optimal rate control parameter is calculated by utilizing those values, and as a result, the packets are assembled and sent out with a rate which is suitable for distributing the data streams to the terminal 102. Once preparation is normally done for sending out the packet to the network 103, as shown in FIG. 4, the "OK" is returned from the transmission/reception layer to the control layer, and then in response to the SETUP command, another "OK" is returned to the terminal 102. In this manner, the system gets ready for distributing the data streams.

Then, the terminal 102 issues a PLAY command to prompt the server 101 to start distributing the data streams. In response to the PLAY command, the server 101 accordingly starts distributing the data streams. The terminal 102 receives and stores the data streams. Then, after a lapse of the above-mentioned prebuffering time (T_delay) since the terminal 102 started storing the data streams, the data streams are decoded and played back. At this time, needless to say, the data streams are distributed based on a rate control parameter which has been appropriately set at SETUP.

At the end of streaming playback, the terminal 102 issues a TEARDOWN command to the server 101. In response to the TEARDOWN command, the server 101 goes through processing to end data stream distribution, and ends the entire procedure. This is the end of the description of the specific operation of the present system.

Figure 5:
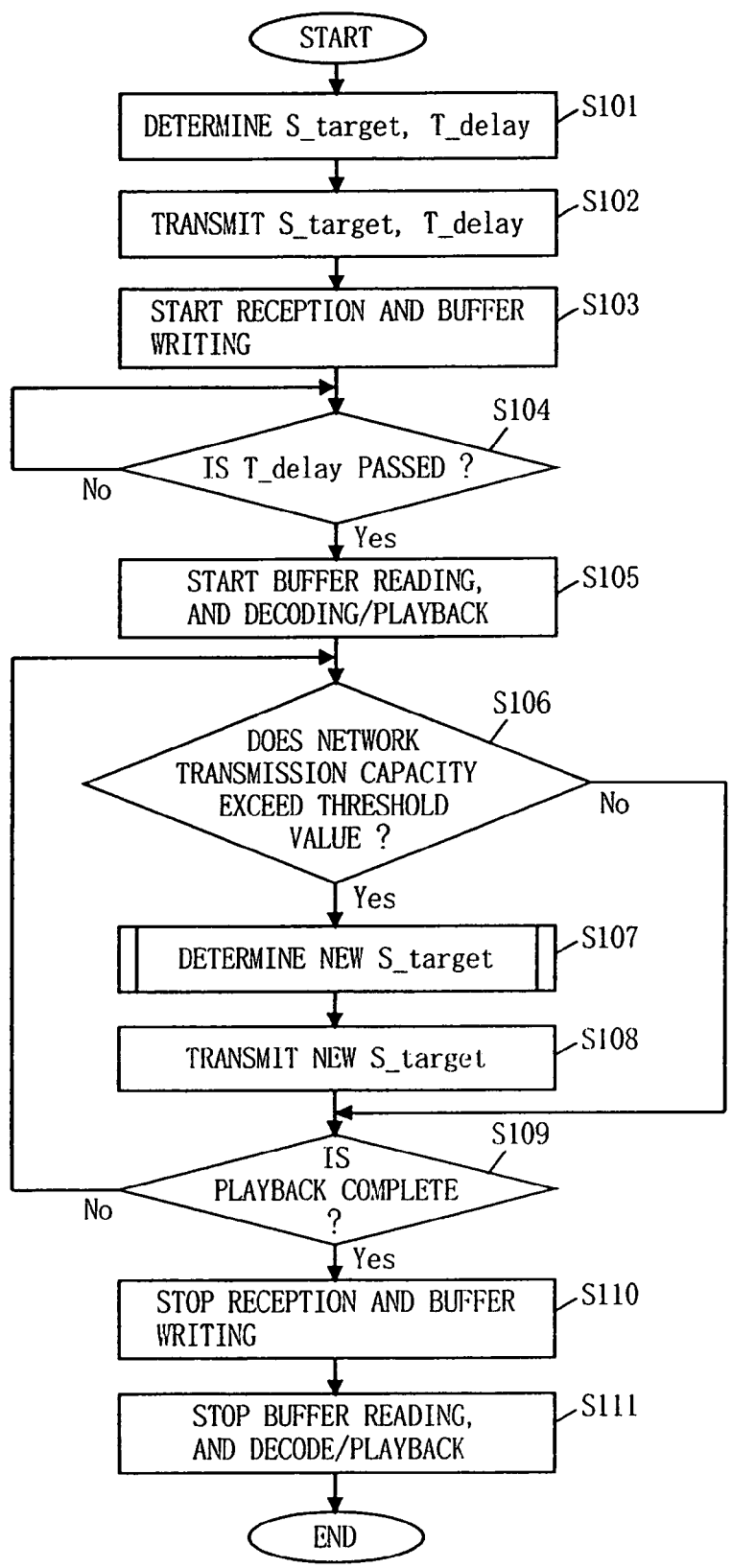
FIG. 5 is a flowchart showing the operation of the terminal 102 of FIG. 1.

The operation of the terminal 102 will now be described in detail. The terminal 102 is presumably a mobile phone which is connectable to the Internet, and is capable of detecting the field intensity (intensity of radio waves to be received thereby). FIG. 5 is a flowchart showing the operation of the terminal 102 of FIG. 1. In FIG. 5, the terminal 102 first determines values of the two parameters S_target and T_delay (step S101).

Figure 6:
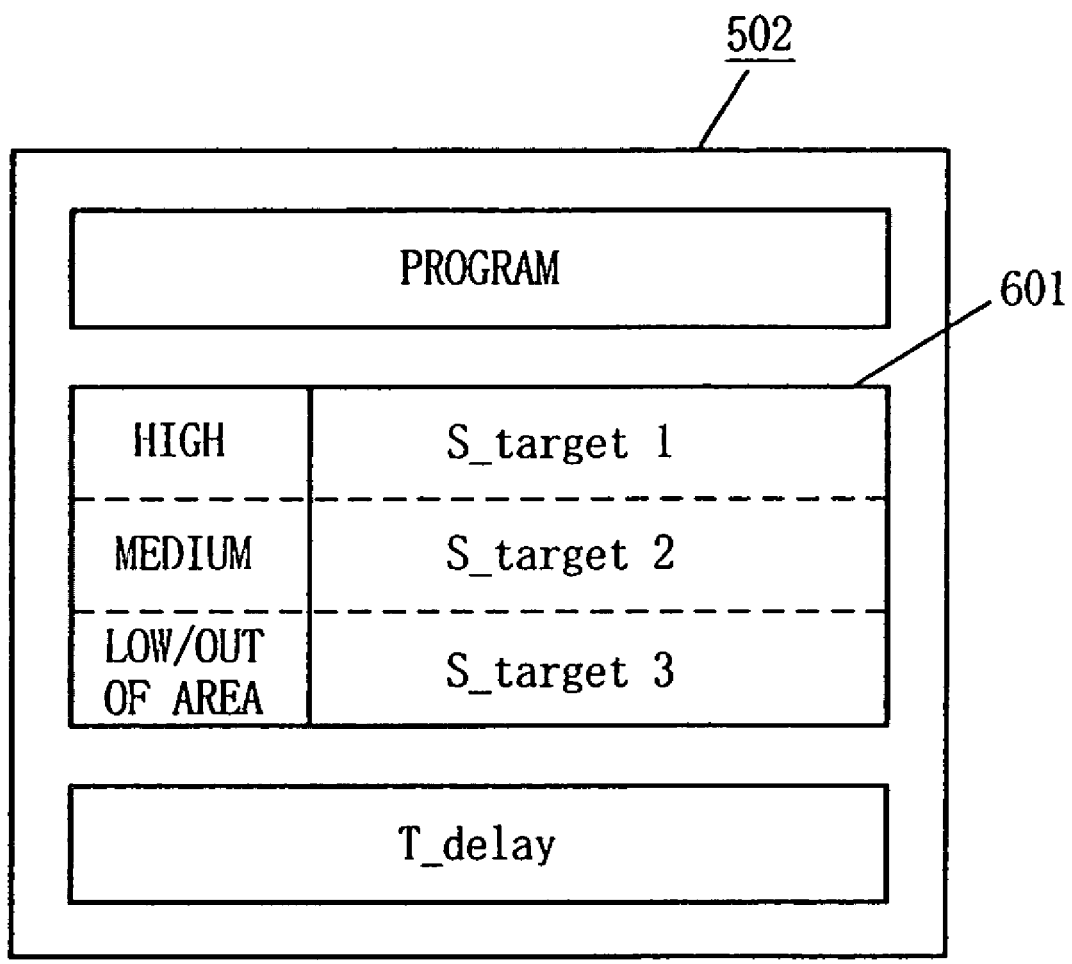
FIG. 6 is a diagram showing the storage contents of a ROM 502 of FIG. 3.

The processing which is carried out in step S101 is now described in detail. FIG. 6 is a diagram showing the storage contents of the ROM 502 of FIG. 3. As shown in FIG. 6, the ROM 502 stores the terminal control program, a table 601 showing the correspondence between the field intensity and the parameter S_target, and the value of the parameter T_delay. Here, for the value of the parameter S_target, three values of S_target1 corresponding to the field intensity "high", S_target2 corresponding to the field intensity "medium", and S_target3 corresponding to the field intensity "low/out of area" are stored. As to the parameter T_delay, only one value is stored.

Those three values of S_target1 to S_target3 are determined so as to satisfy the following relationship:

$$S\_target3 < S\_target1 < S\_target\ 2 \leq S\_max$$

On the other hand, the value T_delay is so determined so as not to exceed the value which is obtained by dividing the value S_max by the effective transmission capacity of the network 103.

As an example, when the value S_max is 512 (KB), S_target1=256 (KB), S_target2=384 (KB), and S_target3=128 (KB) are thus determined, for example. Also, assuming that the effective transmission capacity of the network 103 is 384 (Kbps), that is, 48 (KB/sec), the value T_delay may be determined so as not to exceed $512 \div 48 \approx 10.7$, and arbitrarily determined such as 4 seconds and 3 seconds, for example.

In step S101, the parameter S_target1, as an initial value, and the value T_delay are read from the ROM 502.

Note herein that the values of S_target1 to S_target3, and T_delay are calculated in advance and stored in the ROM 502, and the CPU 503 reads from the ROM 502 any value in need. Alternatively, the ROM 502 may previously store a program for calculating the buffer capacity in total, the effective transmission capacity of the network 103, and the values of the parameters S_target and T_delay. If this is the case, the CPU 503 may read the ROM 502 for the capacity, speed, and the program as required, and calculate the values of S_target and T_delay. In this example, although only one value is stored for the parameter T_delay, this is not restrictive, and several values may be stored in advance for selection there among. This is the processing carried out in step S101.

Refer back to FIG. 5. The terminal 102 attaches the parameters S_target and T_delay which are determined in step S101 to the SETUP command, and transmits the SETUP command to the server 101 (step S102). In response, the server 101 transmits the data streams to the terminal 102. When the data streams are transmitted, the server 101 controls the transmission speed based on the parameters S_target and T_delay notified by the terminal (the operation on the server side will be described later).

Then, the terminal 102 receives the data streams coming from the server 101, and starts operating for buffer writing (step S103). To be specific, as shown in FIG. 3, the data streams coming over the network 103 are first written to the reception buffer 505 via the network controller 506. After a lapse of time and when the reception buffer 505 is filled, the data streams in the reception buffer 505 are read in order from the head, and are written into the decoder buffer 508.

Next, the terminal 102 determines whether the time has passed for T_delay since buffering has started (step S104), and if determined No, waits until the determination becomes Yes. Once the determination in step S104 becomes Yes, the terminal 102 reads the data streams from the buffer, and starts operating for decoding and playback (step S105). To be more specific, in FIG. 3, the CPU 503 is measuring the time since buffering has started, and once the measurement coincides with the value T_delay in the ROM 502, the playback module 510 is instantaneously instructed to start processing of reading the data streams in the decode buffer 508 in order from the head, and inputting those to the decoder 509.

Then, the terminal 102 determines whether the transmission capacity of the network 103 changes and exceeds its threshold value (step S106). Specifically, this determination is made as follows. For example, a host computer (not shown) managing the network 103 is set so as to distribute information about the transmission capacity of the network 103 to the terminal 102 over the network 103 whenever necessary. Based on the information which is provided by the host computer, the terminal 102 then determines whether there is any change in the transmission capacity.

In such a case, specifically, as shown in FIG. 3, the information about the transmission capacity is sent out to the CPU 503 via the transmission/reception module 507. The ROM 502 previously stores the threshold value, and by comparing the transmission capacity information, the retained previous transmission capacity information, and the threshold value in the ROM 502 with one another, the CPU 503 can determine whether the transmission capacity has changed and exceeded the threshold value.

Figure 7A:
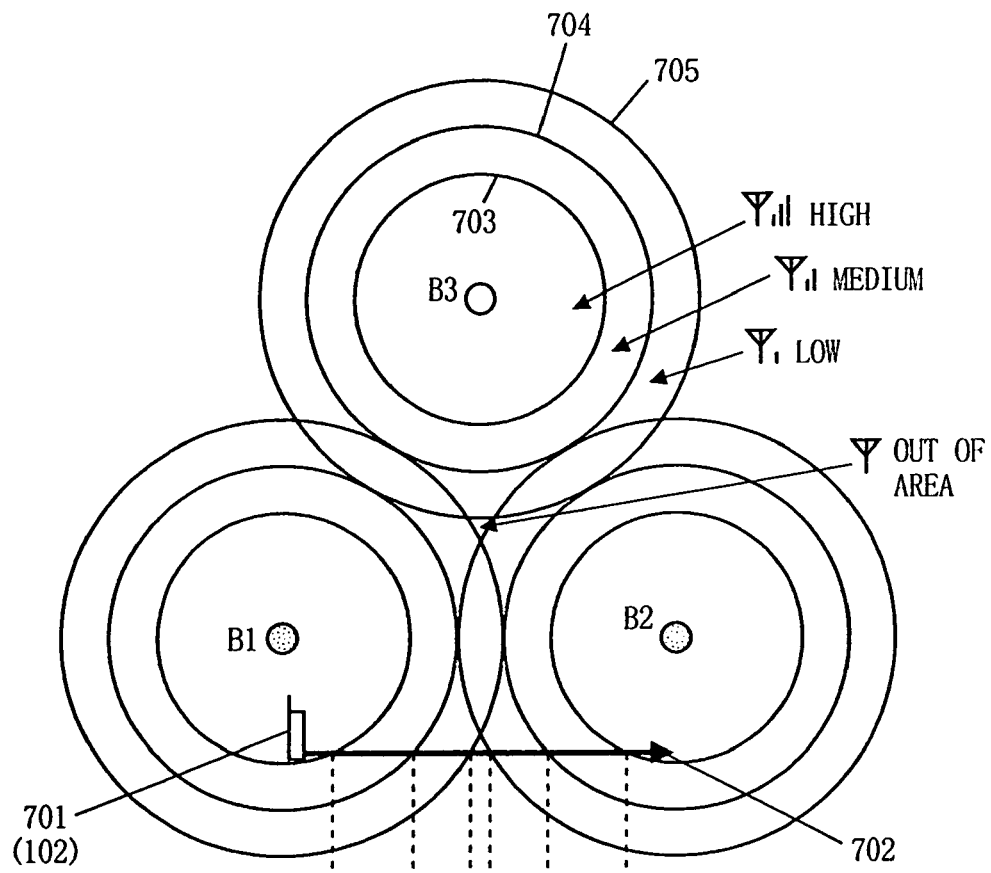
FIG. 7A is a schematic diagram showing a field intensity distribution in a certain area.
Figure 7B:
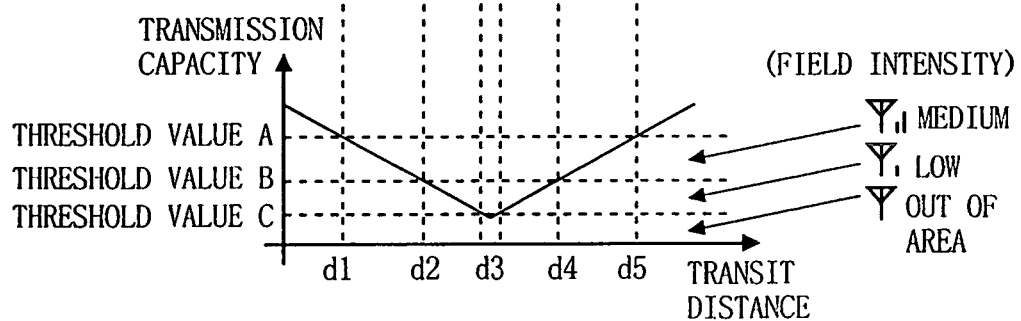
FIG. 7B is a diagram showing the change in transmission capacity which is observed when a terminal moves.

As another example, if the host computer managing the network 103 is not capable of distributing the information about the transmission capacity to the terminal 102, the terminal 102 can make the determination as follows. That is, in the case where the terminal 102 is a mobile phone, as shown in FIGS. 7A and 7B (will be described later), the terminal 102 is capable of detecting the field intensity there around, and displays the result as "high", "medium", "low", or "out of area". By regarding the change of field intensity as the change of transmission capacity of the network 103, the terminal 102 can perform such detection easily.

If the determination in step S106 is Yes, the terminal 102 determines a new S_target (step S107), and transmits the new S_target to the server 101 (step S108). On the other hand, if the determination in step S106 is No, the procedure skips steps S107 and S108, and goes to step S109 (will be described later).

The processing which is carried out in steps S106 and S107 will now be described in detail. Described below is an exemplary case where the terminal 102 is a mobile phone, and the value S_target is changed according to the change of the field intensity. FIG. 7A is a schematic diagram showing a field intensity distribution in a certain area, and FIG. 7B is also a schematic diagram showing the change of transmission capacity which is observed when the terminal moves. Here, the field intensity distribution shown in FIG. 7A covers the area including three relay stations B1 to B3. In FIG. 7A, three groups of concentric circles having the relay stations B1 to B3 each positioned at the center are coverage contours, which are derived by connecting points equal in field intensity.

By taking one group of concentric circles having the relay station B3 positioned at the center as an example, in a concentric circle 703 closest to the relay station B3, the field intensity is "high", and the field intensity in an area between this concentric circle 703 and another concentric circle 704 is "medium". Also, the field intensity in an area between the concentric circles 704 and 705 is "low", and an area outside of the concentric circle 705 is "out of area". Note that those groups of concentric circles partially overlap with one another, and the area being "out of area" in field intensity is quite small.

Assume that the terminal 102 is now moving from the vicinity of the relay station B1 to the vicinity of the relay station B2 along the path denoted by an arrow 702. FIG. 7B shows the field intensity along the arrow 702 of FIG. 7A. The field intensity here can be regarded as the transmission capacity of the network 103. As shown in FIG. 7B, when the terminal 102 is located in the vicinity of the relay station B1, the field intensity is "high", and as the terminal 102 moves away from the relay station B1, the field intensity starts changing to "medium", "low", and then to "out of area". Immediately after the field intensity of the terminal 102 shows "out of area" of the relay station B1, the terminal 102 is again "in area" of the relay station B2, and the field intensity starts gradually changing from "low", "medium", and then to "high".

Immediately after the field intensity changes from "high" to "medium", the terminal 102 moving as such determines that the transmission capacity of the network 103 has changed and exceeded a threshold value A (first threshold value), and thus determines a new S_target. Immediately after the field intensity changes from "medium" to "low", the terminal 102 determines that the transmission capacity of the network 103 has changed and exceeded a threshold value B (second threshold value), and a new S_target is determined. On the other hand, immediately after the field intensity changes from "low" to "medium", the terminal 102 determines that the transmission capacity of the network 103 has changed and exceeded the threshold value B (second threshold value), and thus determines a new S_target. Immediately after the field intensity changes from "medium" to "high", the terminal 102 determines that the transmission capacity of the network 103 has changed and exceeded the threshold value A (first threshold value), and a new S_target is determined.

Note that, generally, the threshold value A (first threshold value) is approximately a median value of the maximum transmission capacity which is achievable by the network 103 and the transmission capacity with which a transfer loss in streaming starts to occur. The threshold value B (second threshold value) is a value corresponding to the transmission capacity with which the transfer loss in streaming starts to occur.

Figure 8:
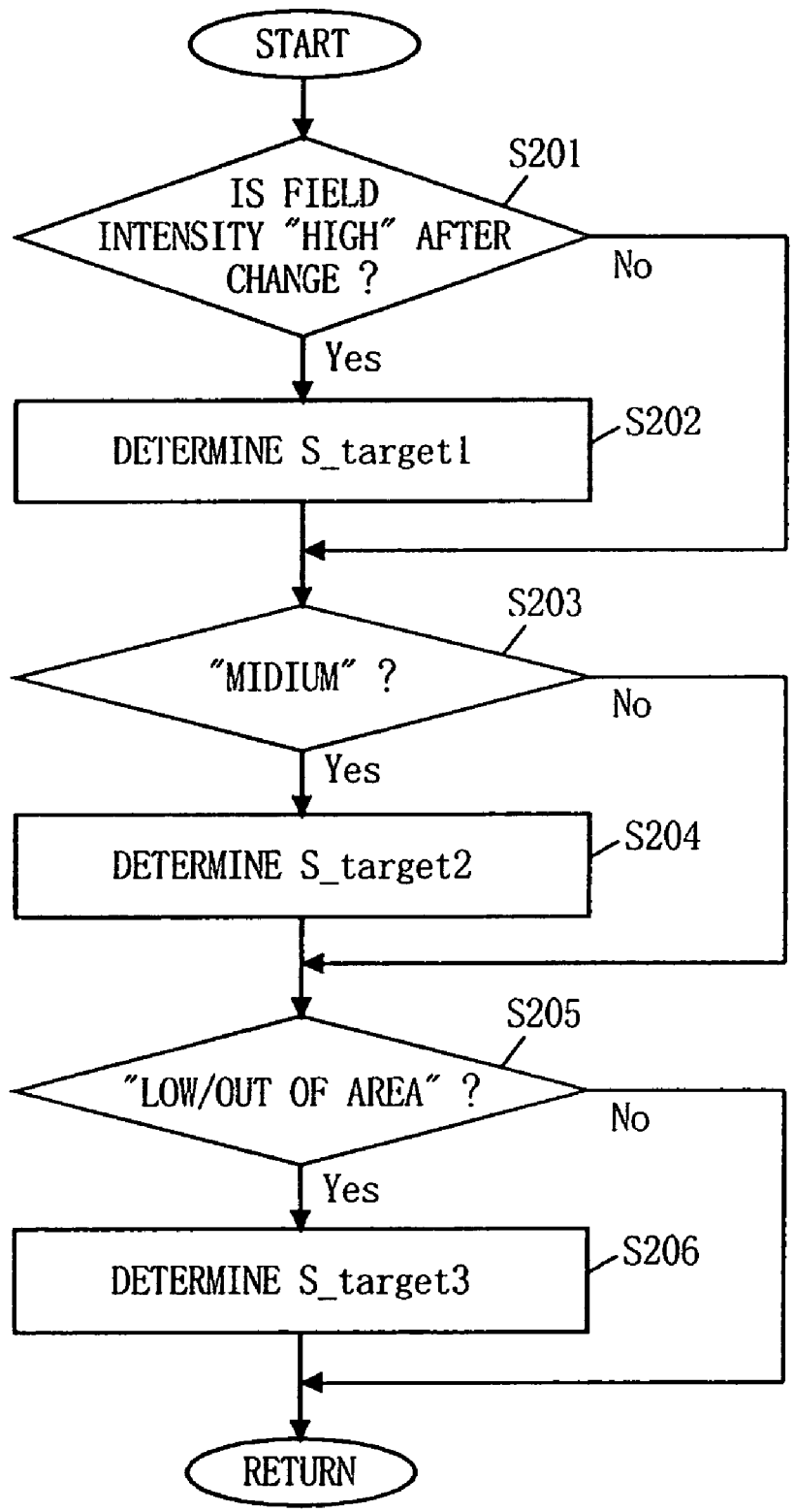
FIG. 8 is a flowchart showing the details of step S107 of FIG. 5.

The new S_target is determined as follows by referring to the table 601 (see FIG. 6) in the ROM 502. FIG. 8 is a flowchart showing the details of step S107 of FIG. 5. In FIG. 8, the terminal 102 first determines whether or not the field intensity after a change shows "high" (step S201), and if determined Yes, a new S_target is set to the value S_target1 (step S202). If the determination in step S201 is No, the procedure skips step S202, and goes to step S203.

Then, the terminal 102 determines whether the field intensity after the change is "medium" (step S203), and if determined Yes, the new S_target is set to the value S_target2 (step S204). If the determination in step S203 is No, the procedure skips step S204, and goes to step S205.

The terminal 102 then determines whether the field intensity after the change is "low/out of area" (step S205), and if determined Yes, the new S_target is set to the value S_target3 (step S206). Then, the procedure returns to the procedure of FIG. 5. If the determination in step S205 is No, the procedure skips step S206, and returns to the procedure of FIG. 5.

Therefore, if the terminal 102 moves along the arrow 702 of FIG. 7A, according to the change of the field intensity, the terminal 102 changes the value of the parameter S_target as S_target1→S_target2→ S_target3→S_target2→S_target1. As a specific example, the change will be 256 (KB)→384 (KB)→128 (KB)→384 (KB)→128 (KB). This is the end of the description about steps S106 and S107 in detail.

Refer back to FIG. 5. In step S108, when the terminal 102 transmits the new S_target to the server 101, the server 101 responsively changes the value of the parameter S_target to the value which is newly notified by the terminal 102, and continues controlling the transmission speed.

The terminal 102 then determines whether now is the time to end streaming playback (step S109), and if determined Yes, transmits the command TEARDOWN to the server 101, and stops receiving and buffering the data streams (step S110). Then, the playback processing is stopped (step S111). On the other hand, if the terminal 102 determines to continue streaming playback, the procedure returns to step S106, and repeats the same processing as above. This is the operation of the terminal 102.

The operation of the server 101 will now be described in detail. Here, for the sake of simplicity, the server 101 performs encoding with an encoding and compressing algorithm for occurring frames with a fixed cycle Tfrm such as MPEG-1 video (ISO/IEC 11172-2), MPEG-2 video (ISO/IEC 13818-2), and MPEG-2 AAC audio (ISO/IEC 13818-

7), for example. Also, the server 101 performs packet assembly on the encoded data with a fixed cycle Ts. Here, this packet assembly is performed on a frame basis.

Figure 9:
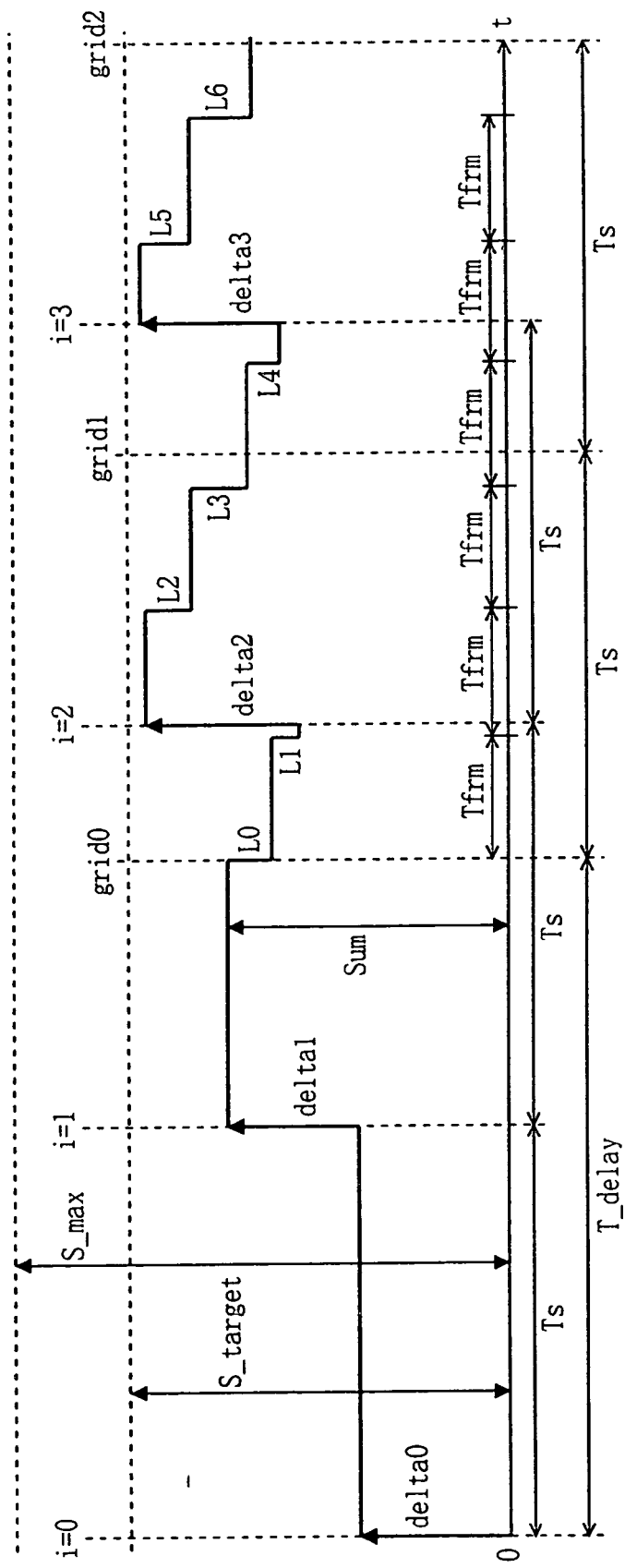
FIG. 9 is a diagram showing the change (drawing near to S_target) of the buffer occupancy of the terminal 102 by a transmission speed control which is performed by the server 101 of FIG. 1.
Figure 10:
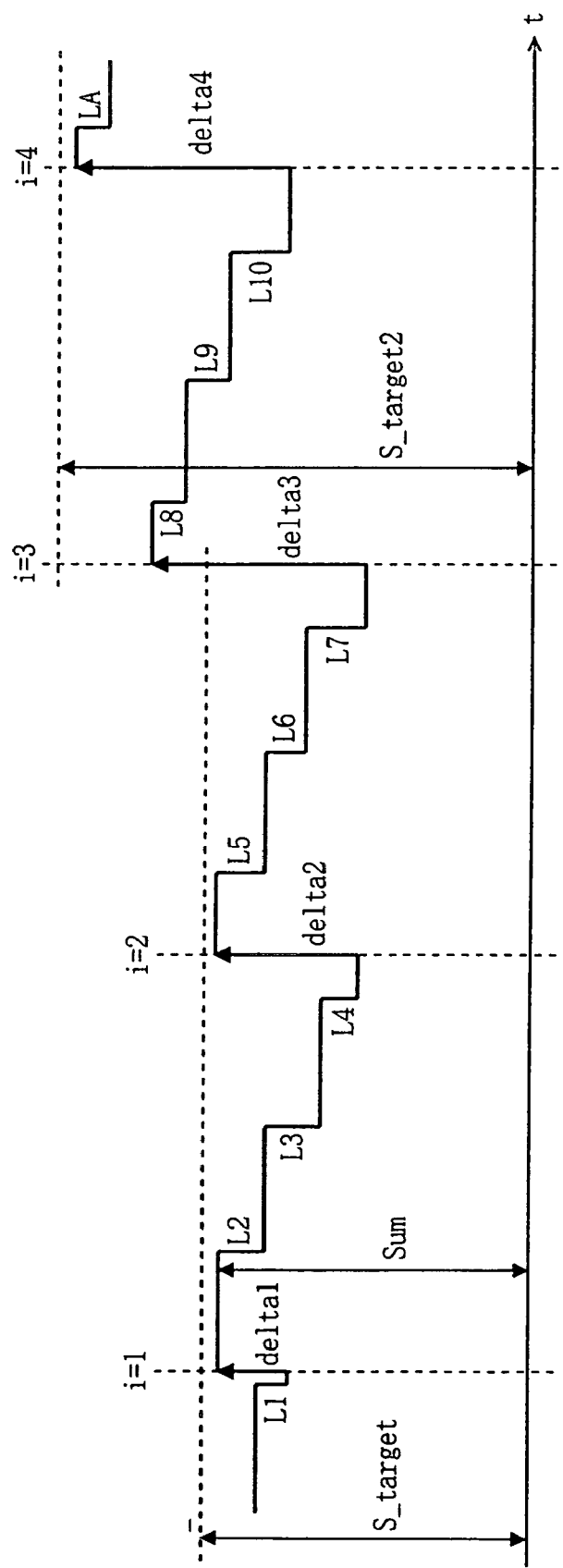
FIG. 10 is a diagram showing the change of the buffer occupancy of the terminal 102 by the transmission speed control which is performed by the server 101 of FIG. 1 in a case where the buffer occupancy is changing in the vicinity of S_target, and a value of S_target is changed to a larger value (S_target2)
Figure 11:
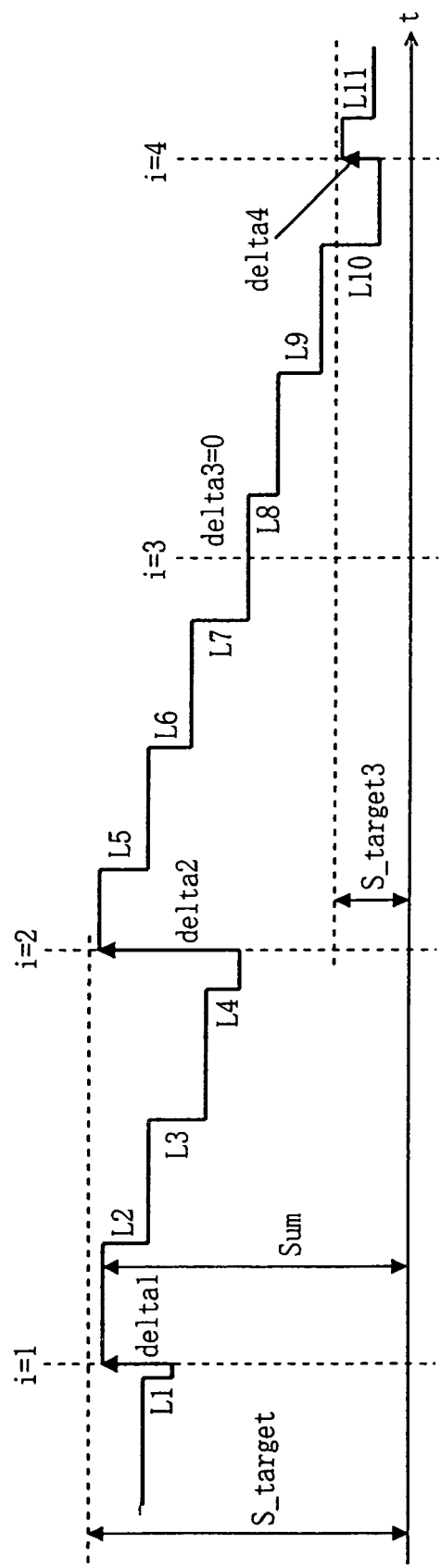
FIG. 11 is a diagram showing the change of the buffer occupancy of the terminal 102 by the transmission speed control which is performed by the server 101 of FIG. 1 in a case where the buffer occupancy is changing in the vicinity of S_target, and the value of S_target is changed to a smaller value (S_target3)

With reference to FIGS. 9 to 11, described first is the control on the transmission speed in streaming which is performed by the server 101. FIGS. 9 to 11 are diagrams showing the change of the amount of data (buffer occupancy) that is stored in the buffer in the terminal 102 by the control on the transmission speed in streaming performed by the server 101. The server 101 controls the transmission speed in streaming so that the buffer occupancy in the terminal 102 receiving data changes as shown in FIGS. 9 to 11.

FIG. 9 shows how the buffer occupancy gets nearer to the value S_target. FIG. 10 shows how the buffer occupancy gets nearer to the value S_target2 in a case where the buffer occupancy is changing in the vicinity of S_target, and the value of S_target is changed to a larger value (S_target2). FIG. 11 shows how the buffer occupancy gets nearer to the value S_target3 in a case where the buffer occupancy is changing in the vicinity of S_target, and the value of S_target is changed to a smaller value (S_target3).

As applicable to all of FIGS. 9 to 11, the value "S_max" indicates the total capacity of the buffer in the terminal 102, and "Sum" denotes the buffer occupancy. "delta (0, 1, 2, . . . )" indicates the amount of data to be transmitted by the server 101 in a unit time Ts, that is, the amount of data that is included in one packet. Here, the unit time Ts denotes a cycle for the server 101 to perform packet transmission, and is a fixed value. "L(0, 1, 2, . . . ) denotes the amount of data for one frame.

Once the server 101 receives the value of the parameter T_delay from the terminal 102, the server 101 controls the transmission speed in streaming based on the received value. This speed control is performed by changing the amount of data that is included in one packet.

As shown in FIG. 9, the amount of data in the packet (i=0) which is first transmitted by the server 101 is delta0. At a time t=0, the buffer occupancy Sum is delta0. After the unit time Ts, the next packet (i=1) including data of delta 1 is received by the terminal 102. At a time t=Ts, the Sum thus becomes {delta0+delta1}. Thereafter, every time the unit time Ts passes, the packets continuously arrive at the terminal 102, and the Sum is increased by delta2, delta3, . . . , and so on.

Here, before the third packet (i=2) arrives, that is, at a time t=T_delay, processing is started for reading data from the buffer and decoding it. Here, decoding is performed on a frame basis, and thus after the time t=T_delay, the Sum is decreased by L0, L1, L2 . . . each time the fixed cycle Tfrm passes.

That is, after the time t=0, the buffer occupancy Sum is gradually increased by delta0, delta1 . . . each time the cycle Ts passes. Then, after the time t=T_delay, the sum is decreased by L0, L1, L2 . . . each time the cycle Tfrm passes. Accordingly, in the time period immediately before the buffer occupancy Sum reaching the target value S_target, the amount of data that is included in one packet may be set to be larger than usual; more generally, the transmission speed is increased so that the speed for buffer writing is faster than the speed for buffer reading. After the time period, the amount of data in one packet is put back to normal so as to balance the speeds of buffer writing and reading. In this manner, the buffer occupancy Sum can be changed in the vicinity of the target value S_target.

With such control of the transmission speed, as shown in FIGS. 10 and 11, even if the target value S_target is changed to a new target value such as S_target2 and S_target3, the buffer occupancy Sum can be changed in the vicinity of the new target value such as S_target2 and S_target3.

That is, in FIG. 10, in a case where the buffer occupancy Sum is changing in the vicinity of the target value S_target, if the value of S_target is changed to a larger value (S_target2), the server 101 increases the amount of data to be included in the packets (i=3, 4) so that the speed of buffer writing becomes faster than the speed of buffer reading. After the buffer occupancy Sum reached the new target value S_target2, the amount of data to be provided to one packet is put back to normal, and the writing speed and reading speed are to be balanced.

In FIG. 11, in a case where the buffer occupancy Sum is changing in the vicinity of the target value S_target, if the value of S_target is changed to a smaller value (S_target3), the server 101 decreases the amount of data to be included the packets (i=3, 4) so that the speed of buffer writing becomes slower than the speed of buffer reading. After the buffer occupancy Sum reached the new target value S_target3, the amount of data to be provided to one packet is put back to normal, and the writing speed and reading speed are to be balanced.

Figure 12:
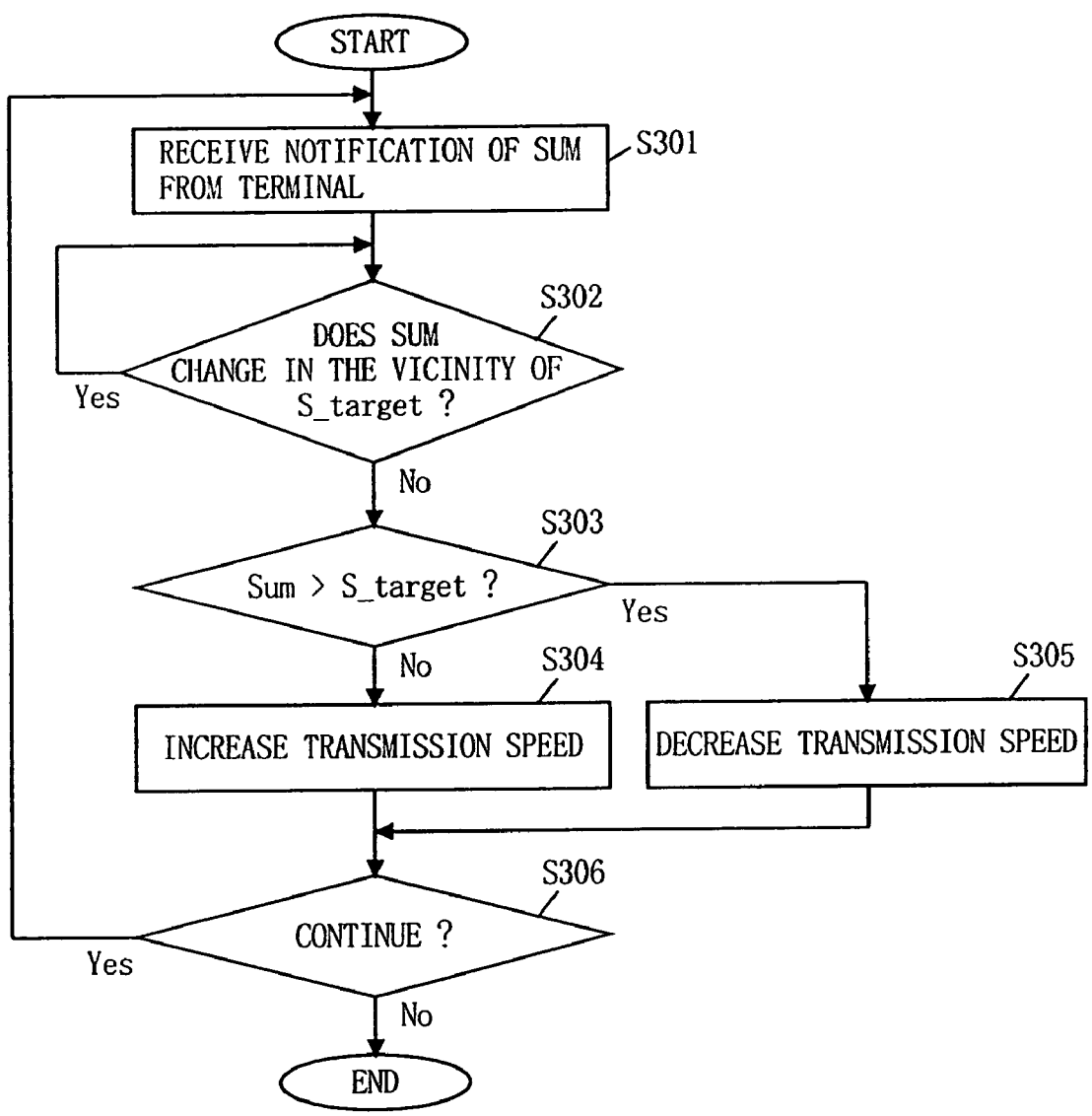
FIG. 12 is a flowchart showing an exemplary algorithm for the transmission speed control which is performed by the server 101 of FIG. 1.

The transmission speed control which is performed by the server 101 will now be described in more detail. FIG. 12 is a flowchart showing an exemplary algorithm for the transmission speed control which is performed by the server 101. In FIG. 12, first of all, the terminal 102 detects its own buffer occupancy (Sum), and the server 101 receives the buffer occupancy Sum from the terminal 102 (step S301). Then, the server 101 determines whether the buffer occupancy Sum notified in step S301 is changing in the vicinity of the target value S_target which is specified by the terminal 102 (step S302). If the determination is Yes, the current transmission speed is maintained.

If the determination in step S302 is No, the server 101 then determines whether the buffer occupancy Sum notified in step S301 is larger than the target value S_target (step S303). If the determination is No, the transmission speed is increased (step S304), and the procedure then goes to step S306. On the other hand, if the determination in step S303 is Yes, the transmission speed is decreased (step S305), and then the procedure goes to step S306.

In step S306, it is determined whether the speed control operation is to be continuously performed, and if determined Yes, the procedure returns to step S301, and the same operation as above is repeated. On the other hand, if the determination in step S306 is No, this is the end of operation. This is the example of the transmission speed control which is performed by the server 101.

Note that, in the example of FIG. 12, the terminal 102 itself detects its own buffer occupancy and notifies it to the server 101. In this case, however, the terminal 102 detects its buffer occupancy at that time. Further, it takes time to transmit information from the server 102 to the server 101, and thus the server 101 performs the transmission speed control based on the buffer occupancy in the past for the delayed time. Therefore, it is actually difficult to make the buffer occupancy change in the vicinity of the value S_target.

In another example to be described below (see FIGS. 13 and 14), the server 101 performs the transmission speed control based on the buffer occupancy at a certain point of time in the future. In this manner, the buffer occupancy can be changed in the vicinity of the value S_target. In this case, instead of being notified by the terminal 102 of the buffer occupancy Sum, the server 101 estimates and calculates the buffer occupancy Sum on the terminal 102 side at a certain point in time in the future. This estimation and calculation are carried out as follows.

That is, in FIG. 2, the ROM 413 previously stores the packet transmission cycle Ts (fixed value) and the decoding cycle Tfrm (fixed value). At the time of packet assembly, the CPU 412 stores the amount of data in one packet (e.g., delta0, delta1, and the like) in the RAM 404. Also, at the time of data stream transmission, the amount of data in each frame (e.g., L0, L1, and the like) is stored in the RAM 404.

The RAM 404 includes the value T_delay which was previously notified by the terminal 102. By referring to the cycles Ts and Tfrm in the ROM 413 and to the values delta(0, 1, 2, . . . ) and T_delay in the RAM 404, and by performing the predetermined computation, the CPU 412 can calculate the buffer occupancy at a certain time in the future. With such computation processing, the server 101 can estimate the change of buffer occupancy Sum on the terminal 102 side (see FIGS. 9 to 11).

With reference to FIGS. 9, 13, 14, and 15, described now is a specific example of the transmission speed control which is carried out by the server 101 by estimating and calculating the buffer occupancy Sum on the terminal 102 side.

In FIG. 9, the value S_max indicates the maximum value of the effective storage of the buffer in the terminal 102, and is simply referred to as a "total buffer capacity". The value S_target indicates a target value for the amount of data to be stored in the buffer in the terminal 102 in the current streaming, and the value T_delay is a setting value for the delay time which is taken to access a specific frame. What these parameters indicate are already described in the foregoing. Assume below that the terminal 102 has already notified both values of S_target and T_delay.

In the present embodiment, for easy understanding, an example is shown in which packet assembly and distribution is carried out on the fixed time cycle Ts basis (packet distribution at a time corresponding to i=n, where n is a positive integer). Here, when packet distribution is performed at the time corresponding to i=n (t=i*Ts), the buffer capacity Sum of the reception buffer 505 and the decoder buffer 508 in the terminal 102 both show an instantaneous increase in the amount of data which is equivalent to the number of frames. This is because, as shown in (A) of FIG. 15, packet assembly is performed in a pattern of inserting a plurality of frames to one packet, and the resulting packet is distributed to the terminal 102. Actually, although packet distribution takes time due to transfer, and thus the buffer occupancy does not instantaneously increase as shown in the drawing (the slope indicates the networkRate), it is considered a simplified model. The stair step decrease in buffer occupancy after the time t=T_delay means that, at that time, streaming playback has started in the terminal 102. That is, for each frame presentation cycle Tfrm, data processing is carried out by the decoder 509 on the frame length L=L[k] basis (where k is a positive integer).

Figure 13:
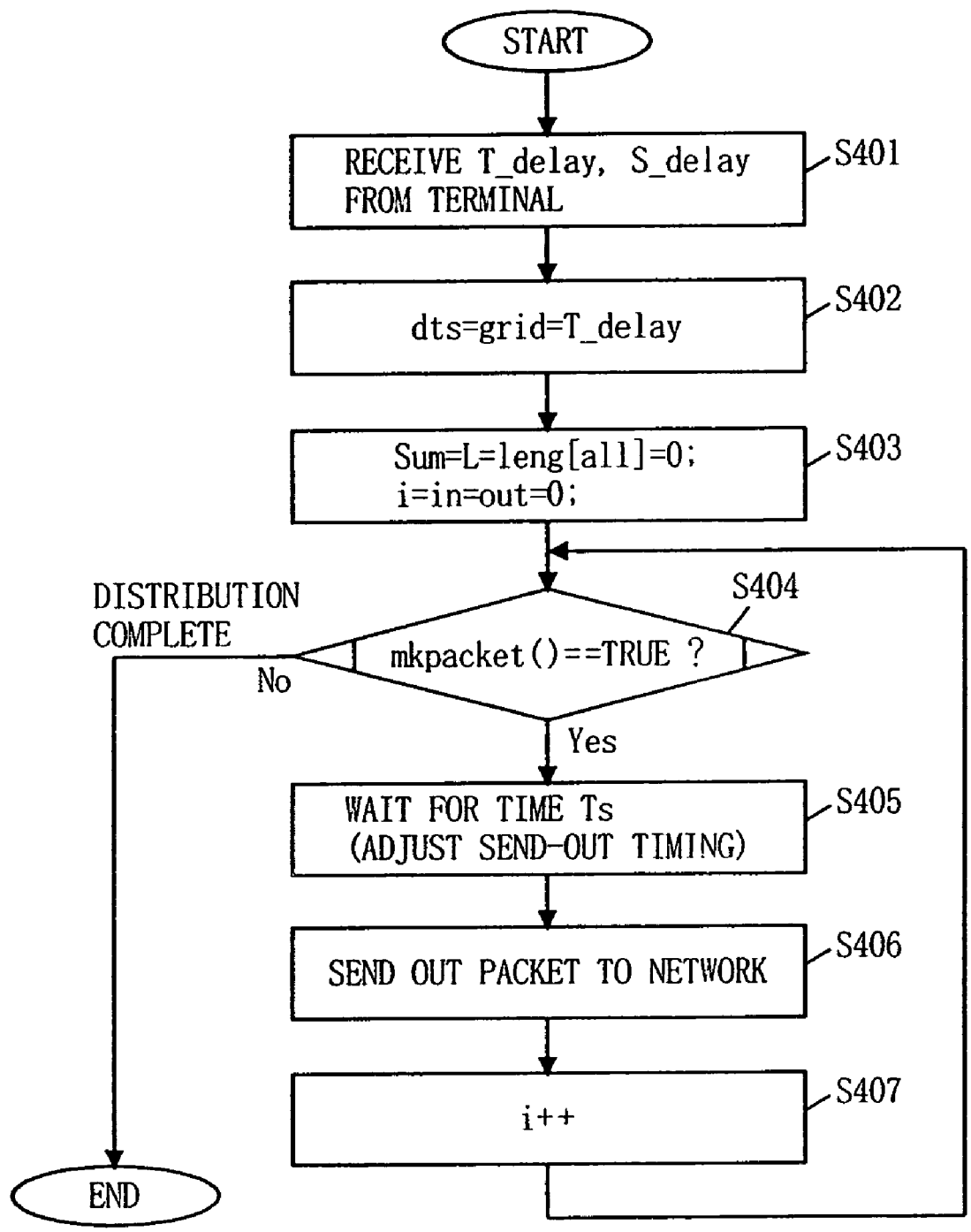
FIG. 13 is a flowchart showing another example of the algorithm for the transmission speed control which is performed by the server 101 to realize the change of buffer occupancy shown in FIGS. 9 to 11.
Figure 14:
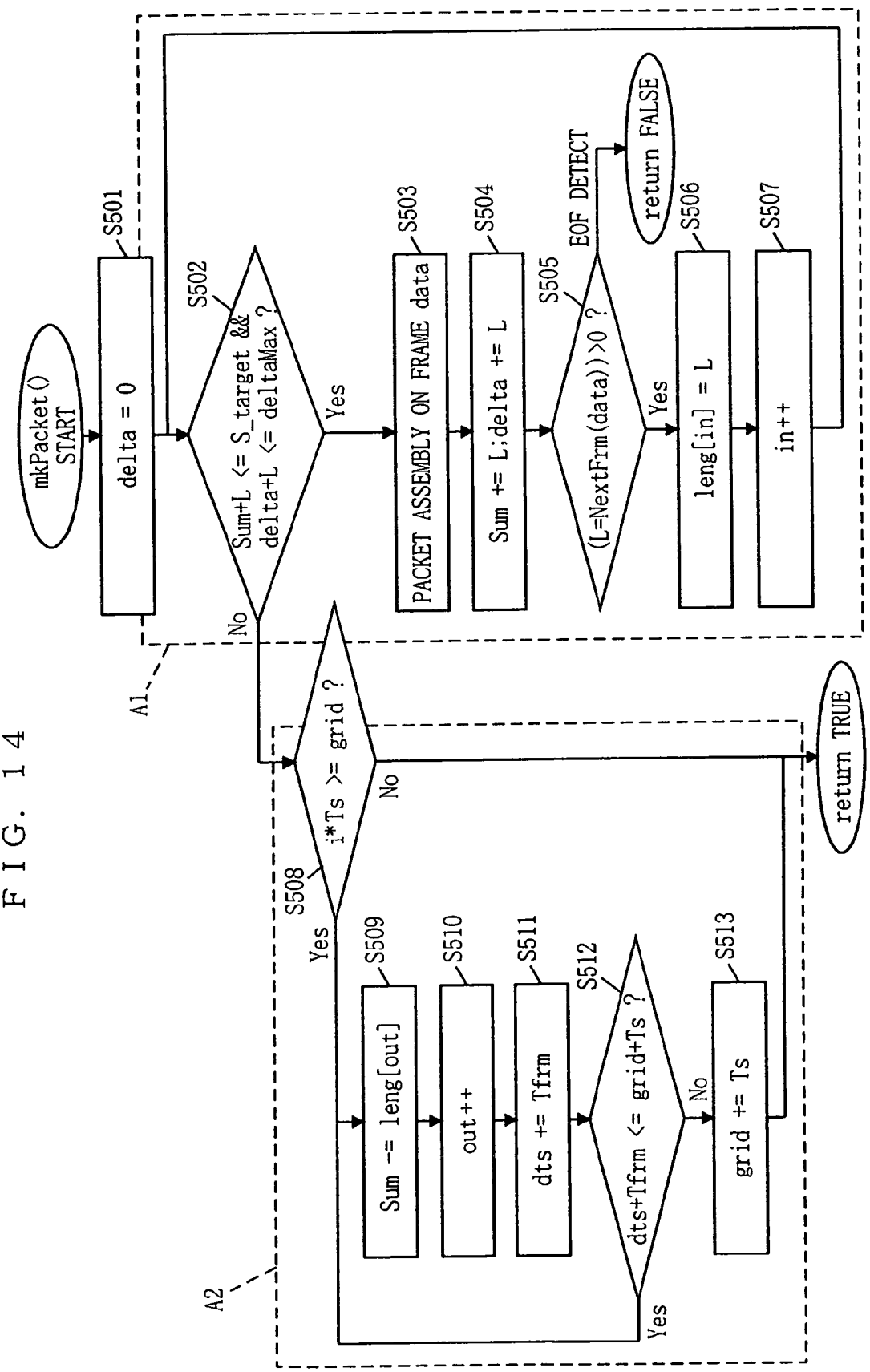
FIG. 14 is a flowchart showing an exemplary function mkPacket in step S404 of FIG. 13.

FIGS. 13 and 14 are flowcharts showing an exemplary algorithm for transmission control which is performed by the server 101 to realize the change of buffer occupancy shown in FIG. 9. Specifically, FIG. 13 shows the entire algorithm, and FIG. 14 shows an exemplary function mkPacket in step S404 in FIG. 13. The ROM 413 (see FIG. 2) stores a program having such an algorithm written thereon, and by following this program, the CPU 412 performs various computations and controls to realize the change of buffer occupancy shown in FIG. 9. Here, for the sake of simplification, the packet distribution is presumed not to be stopped during streaming. The following description is presented step by step.

In FIG. 9, the server 101 receives and stores the values of S_target and T_delay which are transmitted from the terminal 102 (step S401). To be specific, in FIG. 2, the values of S_target and T_delay which are transmitted over the network 103 from the terminal 102 are written into the RAM 404 via the network controller 410.

Herein, the terminal 102 determines the values of S_target and T_delay, and transmits the result to the server 101. This is not restrictive, and the server 101 may store those values in advance, or store information about the device type of the terminal 102 (e.g., the total buffer capacity), and calculate those parameter values based on the stored information.

Then, each variable is initialized (steps S402, S403). The meaning of each variable will be described later with reference to FIG. 14. After the initialization is completed, the processing after step S404, that is, packet assembly with the function mkPacket and packet transmission to the network 103 is started. In this example, the assembled packets are distributed to the terminal 102 in the fixed cycle Ts. Thus, the server 101 performs timing adjustment in step S405, and then packet transmission in step S406. After the processing, the CPU 412 updates an execution counter i of the function mkPacket, and the procedure returns to step S404 to enter the loop. After stream data reading and packet assembly is completed, the CPU 412 exits from the function mkPacket, and the procedure returns to step S404 with a result of FALSE. At this time, the CPU 412 regards the distribution as being completed, and ends the algorithm. This is the description about the algorithm for transmission control.

As to the detailed algorithm of the function mkPacket shown in FIG. 404, each variable will be described first. The variable Sum indicates the total amount of data that is stored in the reception buffer 505 and the decoder buffer 508 in the terminal 102, L denotes the amount of data in a frame, delta denotes the total amount of data that is assembled to packets after the function mkPacket is currently called, in denotes a counter indicating the number of frames of a stream source which is read from the storage device 411, out denotes a counter indicating the number of frames decoded by the decoder 509 in the terminal 102, dts is a time for the frame to be decoded in the decoder 509, and grid is an upper limit value of dts advanced during when one loop of the previous function mkPacket is processed.

In FIG. 14, the function mkPacket mainly includes a packet generation algorithm A1 and a decoding calculation algorithm A2. As to the packet generation algorithm A1, in the first step (S501), the CPU 412 clears delta. In the following step S502, the CPU 412 determines whether the frame of L=L[in] which is already read is to be used for the current packet assembly. The determination is made based on (a) the value obtained by adding the buffer occupancy Sum and the value L does not exceed the value S_target, and (b) the value obtained by adding the data amount delta subjected to packet assembly by the current function call (the current amount of date included in one packet) and the value L do not exceed an upper limit deltaMax, which is the upper limit for the amount of data that can be included in one packet.

Here, deltaMAx is a value satisfying an inequality in (A) of FIG. 15, $$(\text{deltaMax} + hdr)/Ts < \text{NetworkRate}$$

and the maximum value of the amount of data which is distributable to the terminal in the cycle Ts. Deltamax can be calculated from the effective transfer rate (transmission capacity) of the network 103. When determined True in step S502, the procedure goes to step S503, and the CPU 412 performs packet assembly on the frame of L=L[in]. In the following step S504, after the packet assembly, the CPU 412 then updates the values of Sum and delta. In step S505, the CPU 412 then reads data on the next frame from the reading buffer 407, and reads the frame length L from the RAM 404. Then, the CPU 412 determines whether L is larger than 0.

When the determination in step S505 is No, that is, L=0, the CPU 412 regards that every data has been completely read (detect End of File), and exits from the function. The procedure then returns to step S404 in the main procedure (FIG. 13) with the result of FALSE. On the other hand, if the determination is Yes, that is, L=0, the procedure goes to the next step S506, and the CPU 412 includes the L[in] in the sequence leng, that is, causes the RAM 404 to store it. This is due to using the decoding calculation algorithm A2, which will be later described. Then, the procedure goes to step S507, and the CPU 412 updates the frame number read counter in. The procedure then returns to step S502 to enter the loop.

By repeating the packet assembly in the above-described loop, the values of Sum and delta become larger. In step S502, if the value Sum or delta is determined to be sufficiently large, the procedure exits from the loop, and enters the decoding calculation algorithm A2.

In the decoding calculation algorithm A2, in the first step S508, it is determined whether the value i*Ts is equal to or larger than the value grid. This step S508 is for determining whether now is the time for the terminal 102 to start decoding. Specifically, as the value grid is first set to the value T_delay, the function calling counter i shows the small number and the value t=i*Ts is smaller than the value grid, it is determined that decoding is not yet started in the terminal 102. In FIG. 9, the time corresponding to i=0 and i=1 correspond thereto.

If the determination in step S508 is No, the CPU 412 exits from the function without performing subtraction processing on the frame data by decoding. On the other hand, if i becomes sufficiently large and the packet assembly time t=1*Ts becomes equal to or larger than the value grid, the CPU 412 regards that decoding in the terminal 102 has already started, and goes through the subtraction processing on the frame data. In FIG. 9, the time corresponding to i being 2 or larger corresponds thereto. In the loop between steps S509 to S512, the amount of frame data leng[out] which is subjected to decoding processing within the time between the current grid time and the next grid time (=grid+Ts) is subtracted from the buffer occupancy Sum. Also, the decoded frame number out is counted up.

In step S511 in the above-described loop, dst is added by the cycle Tfrm each time the frame is decoded. This is because, in the present embodiment, the encoding scheme is applied wherein frames occur with the fixed time interval Tfrm. In step S512, the CPU 412 determines whether there is any frame to be decoded with the current time interval Ts. If it is determined No in step S512, that is, if determined that there is no more frames to be decoded by the current time interval Ts, the procedure exits from the above-mentioned loop (steps S509 to S512), and goes to step S513. In step S513, the CPU 412 updates the variable grid to the next grid time. Then, the procedure exits from the function, and returns to step S404 in the main procedure (FIG. 13) with a result of TRUE.

With such an algorithm, as shown in FIG. 9, in the terminal 102, the buffer occupancy Sum can be always changed in the vicinity of the value S_target, and not exceed the value S_target. Therefore, even if there are several terminals 102 which are varied in type, and even if the total buffer capacity Smax varies due to the device type, by setting the value S_target according to the value Smax in each terminal 102, the buffer will neither overflow nor underflow.

In this example, as shown in (A) of FIG. 15, packet assembly is performed in a pattern of inserting a plurality of frames into one packet. Alternatively, as shown in (B) of FIG. 15, packet assembly may be performed in a pattern of inserting one frame to one packet. If this is the case, in step S502 of FIG. 14, the second half of the inequality may be changed to $$\text{delta}+(L+hdr)<=\text{deltaMax, and}$$

in step S504, the second half of the equation may be changed to $$\text{delta}+=(L+hdr).$$

In the present embodiment, for the sake of simplicity, the encoding scheme is applied wherein frames occur with the fixed time interval Tfrm. However, if the decoding calculation algorithm A2 is designed according to the encoding scheme to be applied, for example MPEG-4 video (ISO/IEC 14496-2), the frames do not necessarily occur with the fixed time intervals. Also, the algorithm is not necessarily the type for handling data on a frame basis, and may be an algorithm of the type for handling data on a slice basis, or on a pack basis of the MPEG-1 and MPEG-2 system streams.

On the other hand, in step S502 of FIG. 14, if the value of S_target is changed in the process, the present algorithm instantaneously starts going through packet assembly by targeting the new value of S_target after the change. FIGS. 10 and 11 show the change of buffer capacity in such a case where the value of S_target is changed in the process. In FIG. 10, if the value S_target is changed to the value S_target2 at a time i=3 (S_target<S_target2≦S_max), the large amount of frame data is subjected to packet assembly for a while after the change (in FIG. 10, delta3 and delta4). As a result, the buffer capacity Sum reaches the vicinity of the new target value S_target2.

As shown in FIG. 11, if the value S_target is changed to the value S_target3 at a time i=2 (S_target3<S_target), a small amount (delta4) or no amount (delta3) of the frame data is assembled to packets. At the same time, the buffer capacity Sum is consumed by decoding, and therefore, the buffer capacity Sum also reaches the vicinity of the new target value S_target3. By utilizing such a process, according to the transmission capacity of the network 103 (or the state of the terminal 102 for receiving radio waves), the buffer occupancy in the terminal 102 can be dynamically increased/decreased, realizing the following application.

In FIG. 7A, considered now is a case where a user carrying a mobile phone 701 (which corresponds to the terminal 102 of FIG. 1) moves along the arrow 702, that is, from the area of the relay station B1 to the area of the relay station B2. As the mobile phone 701 moves, the relay station B1 has the relay station B2 take over placing calls to/from the mobile phone 701 (i.e., a handover). In this case, the radio wave intensity of the mobile phone 701 is changed as shown in the graph of in FIG. 7B. In the present model, for the sake of simplicity, a point where the intensity changes from high to medium (or from medium to high) is referred to as a threshold value A (first threshold value) which is relevant to the transmission capacity of the network 103, a point where the intensity changes from medium to low (or from low to medium) is a threshold value B (second threshold value), and a point where the intensity changes from low to out of area (or from out of area to low) is a threshold value C (third threshold value).

In FIG. 7B, assuming that the user carrying the mobile phone 701 moves by a distance d1, and the transmission capacity falls short of the threshold value A (first threshold value). In this case, as shown in FIG. 11, the mobile phone 701 changes the value S_delay to a larger value (S_target2), and notifies the value to the server 101. This is done to be ready for the possible further decrease in transmission capacity, and thus the server 101 is prompted to go through new packet assembly and transmission, whereby the buffer in the mobile phone 701 can store data available for longer hours (Δt). In the case where the transmission capacity falls short of the threshold value A (first threshold value) but remains yet above the threshold value B (second threshold value), no packet transfer loss is likely to occur. Thus, the transmission speed can be increased as such.

When the user moves and reaches a distance d2, the transmission capacity falls short of the threshold value B (second threshold value), and the packet transfer loss starts occurring. In this case, as shown in FIG. 11, the mobile phone 701 changes the value S_target to a smaller value (S_target3), and notifies the value to the server 101. This is done to be ready for the possible further decrease in transmission capacity, and thus the server 101 is prompted to hold off on new packet assembly and transmission. The reason therefor is as follows.

As an example, in the case where the mobile phone 701 applies PHS Internet Access Forum Standard (PIAFS) as the communication mode, if any packet transmission loss is occurred, data retransmission processing is carried out based on the protocol in the PIAFS layer, which is a link layer. The reason for holding off new packet assembly and transmission is that the retransmission processing is thereby inappropriately disturbed.

When the user moves and reaches a distance d3, the transmission capacity falls short of the threshold value C (third threshold value), and at that moment, packet transfer becomes difficult. If the user then moves and reaches a distance d4, however, the transmission capacity this time exceeds the threshold value B (second threshold value). As the handover has been already completed, the mobile phone 701 puts back the value S_target3 back to the original S_target this time, and transmits the value to the server 101. In this manner, the data storage, that is, the buffer occupancy Sum is increased. Here, the handover time which is taken for the PHS, for example, is only a few seconds with the user's normal walking speed. Accordingly, by setting the above-described Δt to 3 to 4 seconds, the handover may not disturb streaming playback in the mobile phone 701.

Here, as shown in FIG. 11, if the setting value of the S_target is changed to a smaller value during data stream distribution, the result in step S502 in the algorithm of FIG. 14 does not become True so soon, and, resultantly, data on the next frame cannot be sent out. If this happens often, even if the packet is provided to the terminal 102, the presentation time for the frame data in the packet has already passed, and thus the data is of no use. If this is the case, it may be better for such frame data to not be sent out onto the network 103 in consideration of efficiency.

Figure 16:
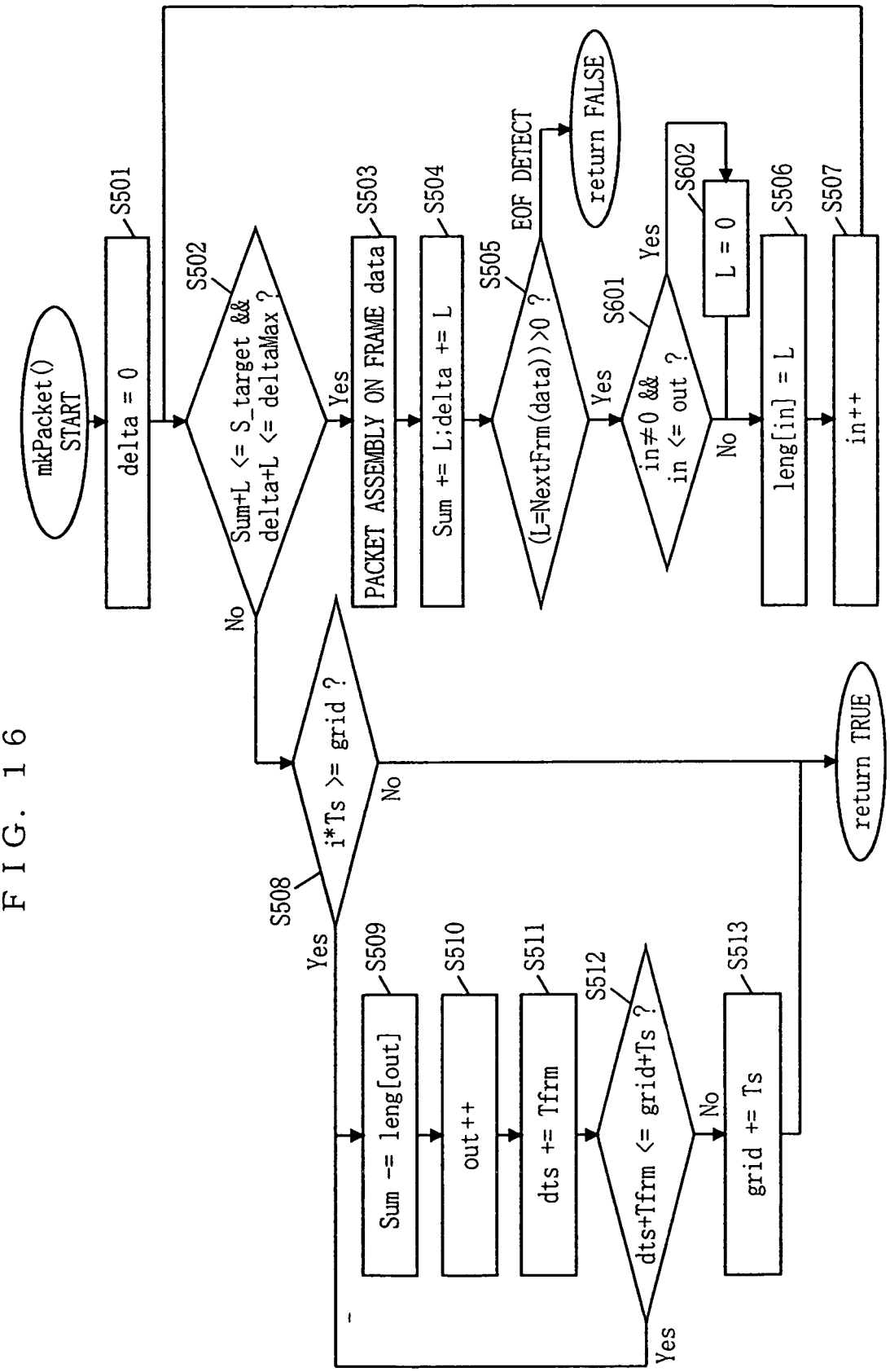
FIG. 16 is a flowchart showing another example of the function mkPacket in step S404 of FIG. 13.

FIG. 16 is a flowchart showing another example of the function mkPacket in step S404 of FIG. 13. The function mkPacket of FIG. 16 includes steps S601 and S602, which are provided for not sending out data whose presentation time has passed when the server 101 decreases the transmission speed. That is, in the algorithm of FIG. 16, this addition of steps S601 and S602 is the only difference from the algorithm of FIG. 14, and other steps are identical therebetween. Thus, those steps are each denoted with the same reference numeral. In step S601, the CPU 412 determines whether an inth frame data to be currently sent out is not a 0th frame data, and is to be presented later than an outth frame data which is regarded as having been decoded in the terminal 102.

If this result is True, the CPU 412 regards that the inth frame data can be in time for the presentation time at the terminal, thus performs data assembly on the data in step S503, and sends it out to the terminal 102. If the result is False, the CPU 412 regards the inth frame data as not existing, and in step S602, sets L=0. In this manner, the result in step S502 becomes always True, and at the time of packet assembly in step S503, data frames can be sent out without copying any unwanted frame data. If there is such a frame skip, playback which is performed in the decoder 509 becomes shorter by the time Tfrm, and information indicating such is written in the packets shown in (A) and (B) of FIG. 15 to inform the terminal 102. For example, a header may be provided with a region to which such information about presentation time is written.

The algorithm shown in FIG. 16 is considered sufficiently effective if the frames are similar in priority (priority level) as the MPEG audio. As to the MPEG video, on the other hand, as described in the Background Art section above, I frames can each restructure an image of a meaning. However, P and B frames cannot restructure an image of a meaning without other frames temporally before and after such frames for reference. In this case, when decimating the frames in the algorithm of FIG. 16, the I frames being in time for the presentation time are sent out with higher priority, and all of the P and B frames are skipped. By doing this, even if the transfer speed of the network 103 is slow, the image of higher quality can be provided to the terminal 102.

Figure 17:
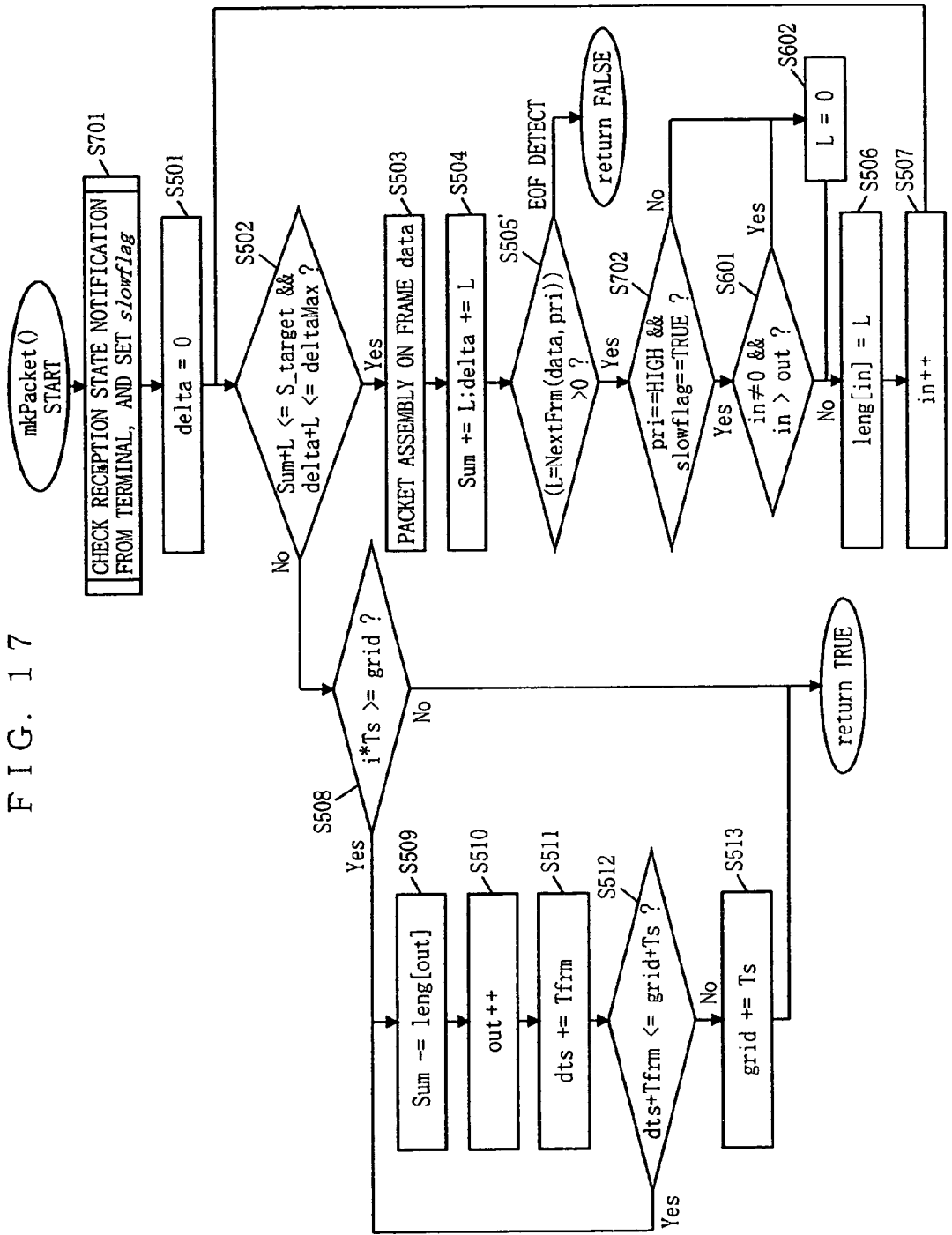
FIG. 17 is a flowchart showing still another example of the function mkPacket in step S404 of FIG. 13.

FIG. 17 is a flowchart showing another example of the function mkPacket in step S404 of FIG. 13. The function mkPacket of FIG. 17 includes steps of S505', S601, S602, S701, and S702 for skipping sending out the data with lower priority and the data of higher priority whose presentation time has already passed when the server 101 decreases the transmission speed. Compared with the algorithm of FIG. 14, the algorithm of FIG. 17 additionally includes steps S601, S602, S701, and S702, and step S505 is replaced by step S505'. Here, step S505' is the one which is additionally provided with a detection function of a priority pri to the function nexTfrm. Other steps are identical to those in FIGS. 14 and 16, and thus each are denoted with the same reference numeral.

Therefore, as compared with FIG. 16, the algorithm of FIG. 17 is additionally provided with steps S701 and S702, and step S505 is replaced by step S505'.

Figure 18:
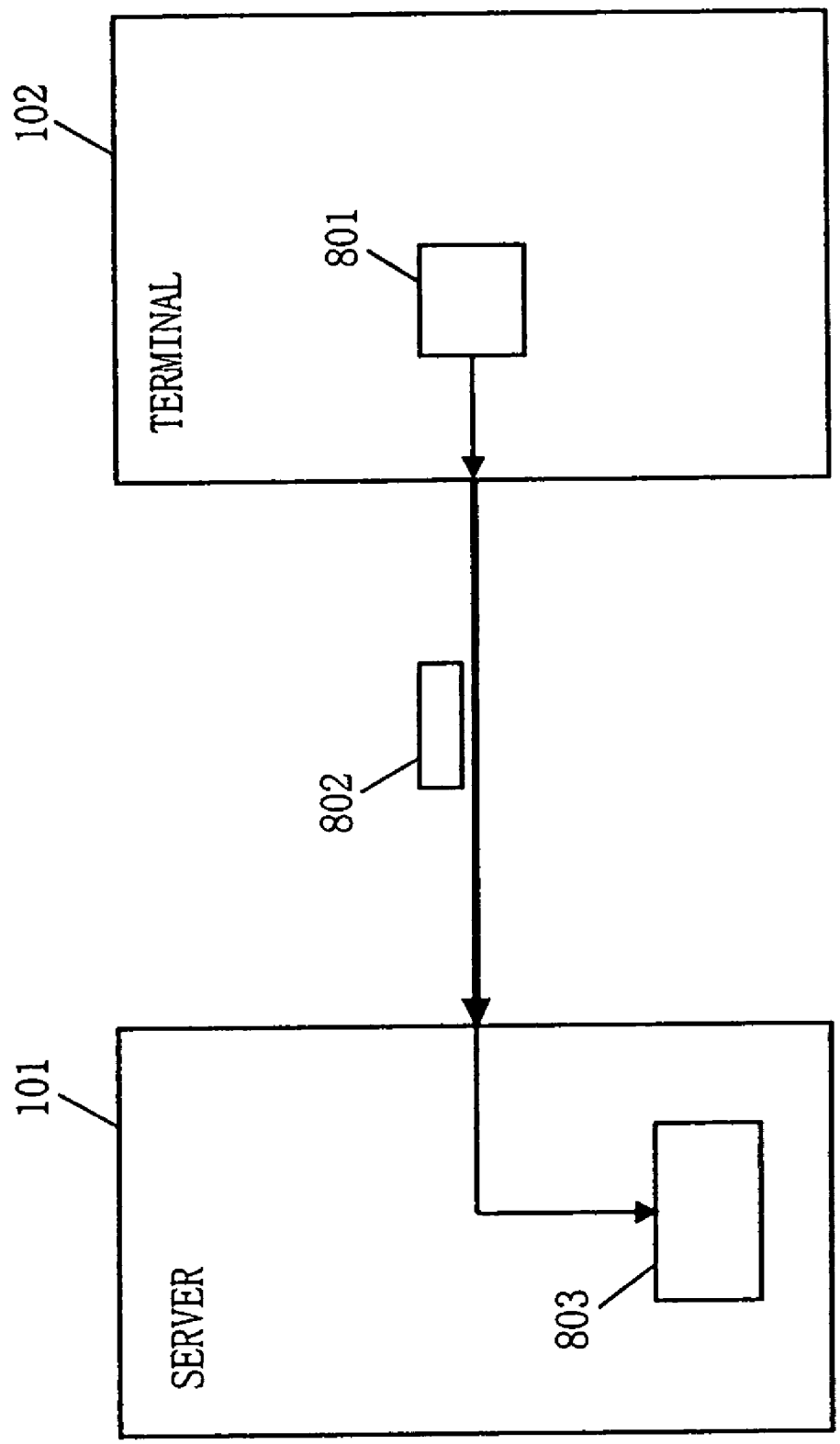
FIG. 18 is a block diagram exemplarily showing another structure of the server-client system wherein the streaming method according to the embodiment of the present invention is carried out.
Figure 19:
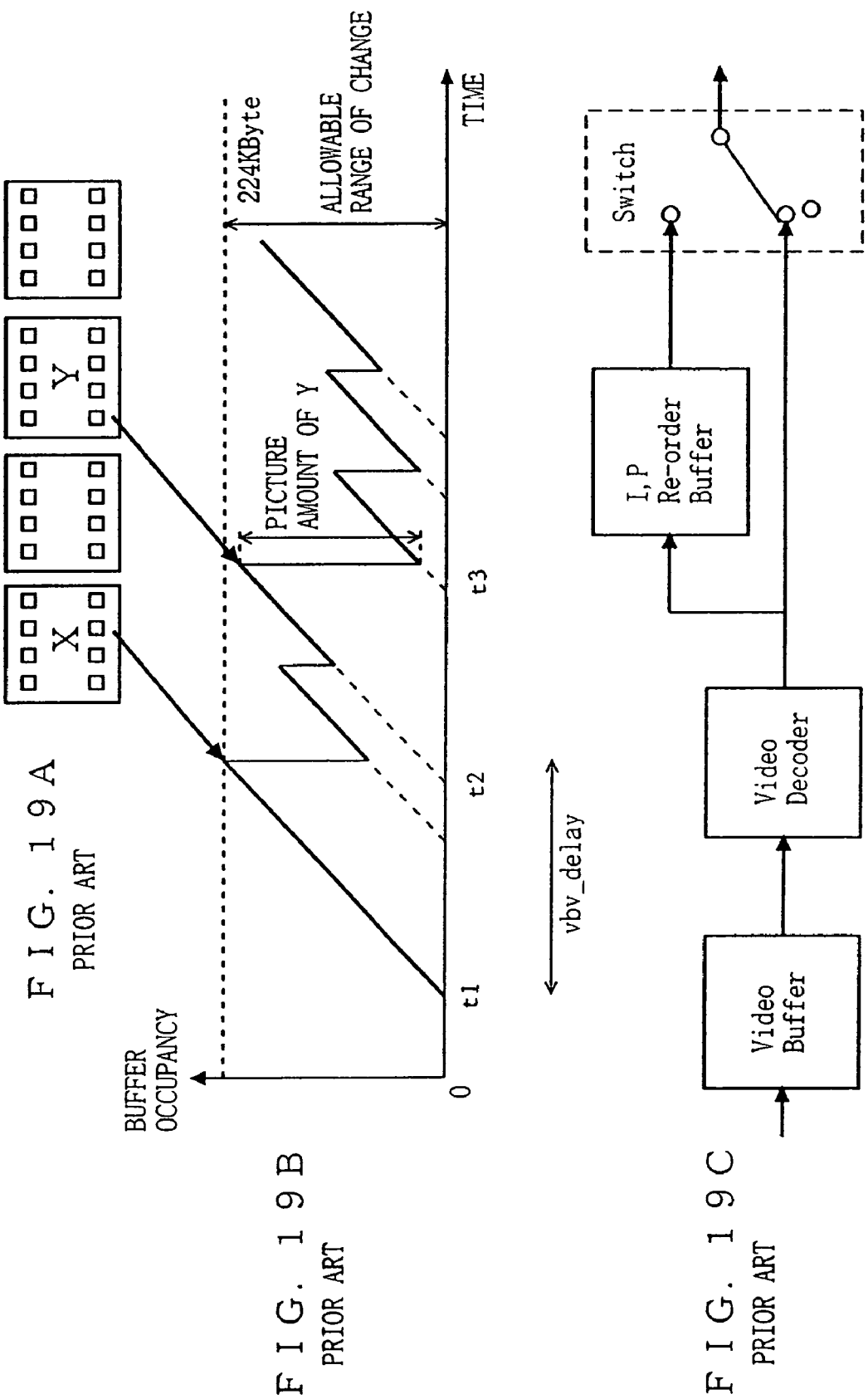
FIG. 19A is a diagram for illustrating a conventional streaming method, and shows video frames.
FIG. 19B is a diagram for illustrating the conventional streaming method, and shows a change of buffer occupancy.
FIG. 19C is a diagram for illustrating the conventional streaming method, and exemplarily shows the structure of a conventional terminal.
Figure 20:
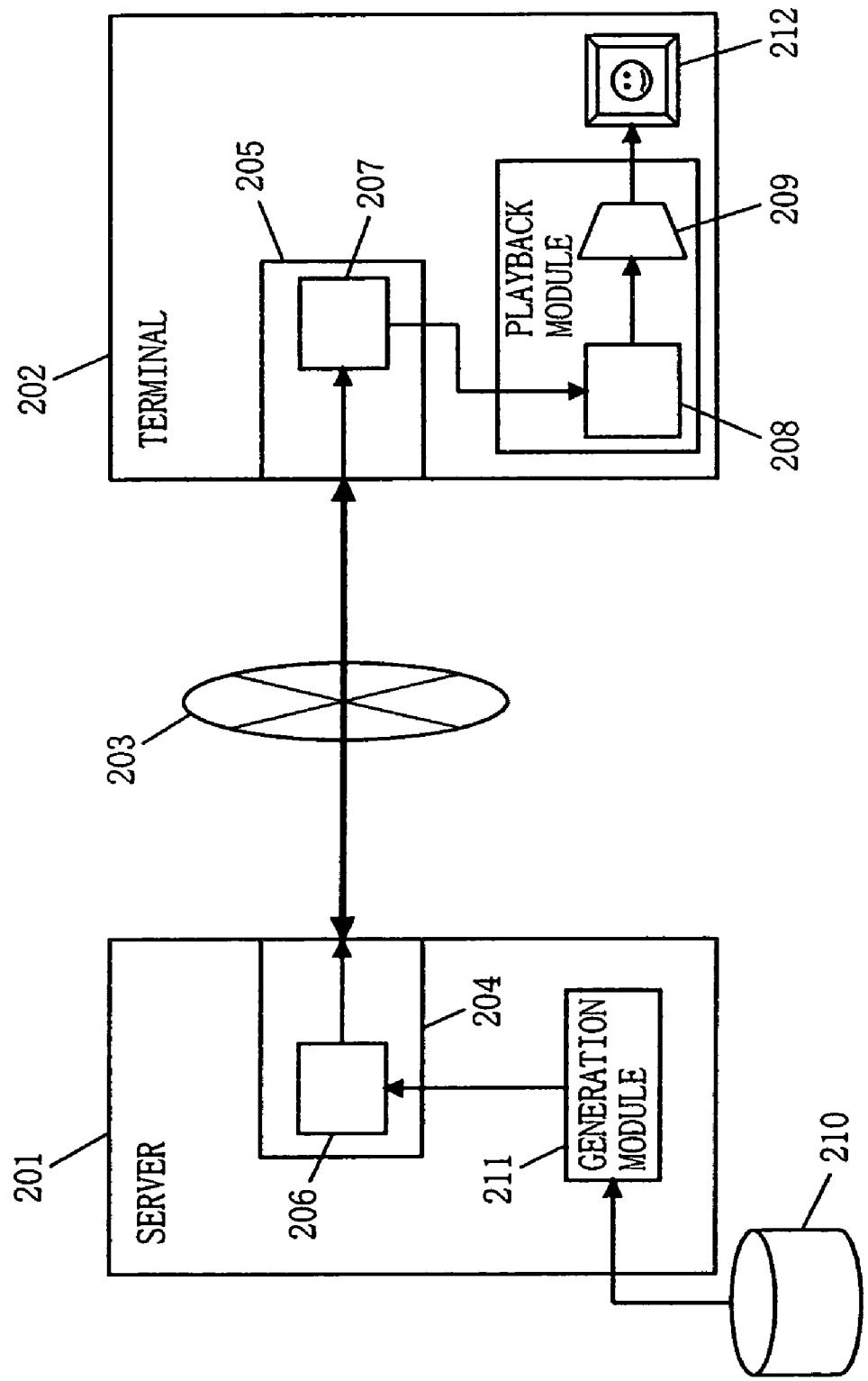
FIG. 20 is a block diagram exemplarily showing the structure of a server-client system wherein the conventional streaming method is carried out.

To execute the algorithm of FIG. 17, a function of notifying the information (reception state information) indicating the receiving state which is detected by the terminal 102 to the server 101 needs to be included. FIG. 18 shows the structure of a server-client system with such a function. In FIG. 18, the terminal 102 includes a detection part 801 for detecting the reception state. Between the terminal 102 and the server 101, a notification part 802 is provided for notifying the detected reception state information from the terminal 102 to the server 101. The server 101 is provided with a retention part 803, and retains the notified reception state information.

Refer back to FIG. 17 again. Once the function mkPacket is called, prior to step S501, step S701 is carried out. In step S701, the server 101 (of the CPU 412) refers to the information which is retained in the retention part 803, and determines whether the transmission capacity of the network 103 falls short of the threshold value B (second threshold value). If determined Yes, a slowflag is considered True: otherwise it is considered False. Here, the slowflag indicates that the transmission speed of the network 103 is slow.

In step S505', the priority of the next frame is detected. In the following step S702, it is then determined whether or not the frame data has a higher priority, and whether or not the slowflag is True. If determined Yes, that is, if the slowflag is True and the frame has the higher priority, the procedure goes to step S601. In step S601, it is then determined whether or not the presentation time for the frame has already passed. On the other hand, if determined No, the procedure goes to step S602, and L=0 is set. That is, even if the frame seems to be in time for the presentation time, the frame is skipped. The processing hereafter is exactly the same as that in FIGS. 14 and 16.

As described above, according to the present embodiment, the terminal 102 determines its own buffer capacity and a target value according to the transmission capacity of the network 103. The terminal 102 also determines a delay time within a range not exceeding a value which is obtained by dividing the target value by the transmission capacity. Based on the target value and the delay time which are determined by the terminal 102, the server 101 controls the transmission speed. Therefore, even if the buffer capacity of the terminal 102 varies due to the device type, and even if the transmission capacity of the network 103 fluctuates, the transmission speed control can be performed according to the buffer capacity and the transmission capacity. Therefore, streaming playback due to underflow and overflow of the buffer is successfully undisturbed. What is better, the delay time is determined separately from the target value, and therefore, the streaming playback can be avoided while the waiting time to access a specific frame is reduced.

While the present invention has been described in detail, the foregoing description is in all aspects illustrative and not restrictive. It is to be understood that numerous other modifications and variations can be devised without departing from the scope of the present invention.

What is claimed is:

1. A streaming method in which a server transmits stream data to a terminal over a network, and the terminal plays back the stream data while receiving the stream data from the server,
   wherein, in the terminal, said method comprises:
      determining a target value of the stream data to be stored in a buffer of the terminal in relation to a buffer capacity of the terminal and a transmission capacity of the network;
      arbitrarily determining, in a range not exceeding a value obtained by dividing the buffer capacity by the transmission capacity, a delay time from when the terminal writes head data of the stream data to the buffer to when the terminal reads the data to start playback;
      notifying the server of the determined target value and the determined delay time; and
   wherein, in the server, said method comprises controlling a transmission speed based on the notified target value and the notified delay time when the server transmits the stream data to the terminal over the network.

2. The streaming method according to claim 1, wherein in said controlling of the transmission speed, the server controls the transmission speed so that an amount of the stream data stored in the buffer of the terminal changes in the vicinity of the target value without exceeding the target value.

3. The streaming method according to claim 2, wherein in said controlling of the transmission speed, the server estimates and calculates the amount of the stream data stored in the buffer of the terminal based on the transmission speed, the delay time, and a speed of the terminal decoding the stream data.

4. The streaming method according to claim 1, wherein, in the terminal said method further comprises:
   detecting whether the transmission capacity of the network exceeds a predetermined threshold value;
   changing the target value based on a result detected in said detecting; and
   notifying the server of a new target value after the target value is changed in said changing of the target value; and
   wherein, in said controlling of the transmission speed, when receiving the new target value after the target value is changed, the server controls the transmission speed so that the amount of the stream data stored in the buffer of the terminal changes in the vicinity of the new target value after the target value is changed without exceeding the new target value after the target value is changed.

5. The streaming method according to claim 4, wherein:
   in said detecting, when detecting that the transmission capacity of the network falls short of a first threshold value, the terminal controls the target value to be increased in said changing of the target value; and
   in said controlling of the transmission speed, in response to the target value being increased, the server controls the transmission speed to be increased.

6. The streaming method according to claim 5, wherein the first threshold value is approximately a median value of an achievable maximum transmission capacity and a transmission capacity with which a stream data transfer loss starts occurring.

7. The streaming method according to claim 4, wherein:
   in said detection, when detecting that the transmission capacity of the network falls short of a second threshold value which is smaller than a first threshold value, the terminal controls the target value to be decreased in said changing of the target value; and
   in said control of the transmission speed, in response to the target value being decreased, the server controls the transmission speed to be decreased.

8. The streaming method according to claim 7, wherein the second threshold value is a value corresponding to the transmission capacity with which the stream data transfer loss starts occurring.

9. The streaming method according to claim 8, wherein, when the terminal controls the target value to be decreased in said changing of the target value, the server controls the transmission speed to be decreased by comparing a presentation time of each frame structuring the stream data to be transmitted with a current time, and by skipping transmitting any frame whose presentation time is older than the current time.

10. The streaming method according to claim 8, wherein, when the terminal controls the target value to be decreased in said changing of the target value, the server, in said controlling the transmission speed,
    compares a priority level of each frame structuring the stream data to be transmitted with a reference value,
    skips transmitting each frame whose priority level is lower than the reference value, and
    compares each presentation time for any frame whose priority level is higher than the reference value with the current time, and skips transmitting any frame whose presentation time is older than the current time.

11. A system including a server for transmitting stream data over a network, and a terminal for playing back the stream data while receiving the stream data from said server, wherein said terminal comprises:
    target value determination means for determining a target value of stream data to be stored in a buffer of said terminal in relation to a buffer capacity of said terminal and a transmission capacity of the network;
    delay time determination means for arbitrarily determining, in a range not exceeding a value obtained by dividing the buffer capacity by the transmission capacity, a delay time from when said terminal writes head data of the stream data to the buffer to when said terminal reads the data to start playback; and
    notifying means for notifying the server of the target value determined by said target value determination means and the delay time determined by said delay time determination means; and
    wherein said server comprises control means for controlling a transmission speed based on the notified target value and the delay time when transmitting the stream data to said terminal over the network.

12. A terminal working with a server for transmitting stream data over a network, and playing back the stream data while receiving the stream data from said server,
    wherein said server comprises control means for controlling a transmission speed based on a target value and a delay time when transmitting the stream data to said terminal over the network; and
    wherein said terminal comprises:
        target value determination means for determining the target value of the stream data to be stored in a buffer of said terminal in relation to a buffer capacity of said terminal and a transmission capacity of the network;
        delay time determination means for arbitrarily determining, in a range not exceeding a value obtained by dividing the buffer capacity by the transmission capacity, the delay time from when said terminal writes head data of the stream data to the buffer to when said terminal reads the data to start playback; and
        notifying means for notifying said server of the target value determined by said target value determination means and the delay time determined by said delay time determination means.

13. A server for transmitting stream data over a network, and working together with a terminal for playing back the stream data while receiving the stream data from said server,
    wherein said terminal comprises:
        target value determination means for determining a target value of the stream data to be stored in a buffer of said terminal in relation to a buffer capacity of said terminal and a transmission capacity of the network;
        delay time determination means for arbitrarily determining, in a range not exceeding a value obtained by dividing the buffer capacity by the transmission capacity, a delay time from when said terminal writes head data of the stream data to the buffer to when said terminal reads the data to start playback; and
        notifying means for notifying said server of the target value determined by said target value determination means and the delay time determined by said delay time determination means;
    wherein said server comprises control means for controlling a transmission speed based on the notified target value and the delay time when said server transmits the stream data to said terminal over the network; and
    wherein said control means controls the transmission speed so that the amount of the stream data stored in the buffer of said terminal changes in the vicinity of the target value without exceeding the target value.

14. A computer-readable recording medium storing a program describing a streaming method in which a server transmits stream data to a terminal through a network, and the terminal plays back the stream data while receiving the stream data from the server,
    wherein, in the terminal, said method comprises:
        determining a target value of the stream data to be stored in a buffer of the terminal in relation to a buffer capacity of the terminal and a transmission capacity of the network;
        arbitrarily determining, in a range not exceeding a value obtained by dividing the buffer capacity by the transmission capacity, a delay time from when the terminal writes head data of the stream data to the buffer to when the terminal reads the data to start playback;
        notifying the server of the determined target value and the determined delay time; and
    wherein, in the server, said method comprises controlling a transmission speed based on the notified target value and the notified delay time when the server transmits the stream data to the terminal over the network.

15. A computer-readable recording medium on which a program is recorded, said program describing a streaming method in which a server transmits stream data to a terminal through a network and the terminal plays back the stream data while receiving the stream data from the server,
    wherein said program causes the terminal to perform an operation of:
        determining a target value of the stream data to be stored in a buffer of the terminal in relation to a buffer capacity of the terminal and a transmission capacity of the network;
        arbitrarily determining, in a range not exceeding a value obtained by dividing the buffer capacity by the transmission capacity, a delay time from when the terminal writes head data of the stream data to the buffer to when the terminal reads the data to start playback; and
        notifying the server of the determined target value and the determined delay time; and
    wherein said program causes the server to perform an operation of controlling a transmission speed based on the notified target value and the notified delay time when the server transmits the stream data to the terminal over the network.

* * * * *